(12) United States Patent
Dinsmore et al.

(10) Patent No.: US 7,043,024 B1
(45) Date of Patent: May 9, 2006

(54) SYSTEM AND METHOD FOR KEY DISTRIBUTION IN A HIERARCHICAL TREE

(75) Inventors: Peter T Dinsmore, Ellicott City, MD (US); Michael Heyman, Columbia, MD (US); Peter Kruus, Clarksville, MD (US); Alan T Sherman, Columbia, MD (US)

(73) Assignee: McAfee, Inc., Santa Clara, CA (US)

( * ) Notice: Subject to any disclaimer, the term of this patent is extended or adjusted under 35 U.S.C. 154(b) by 543 days.

(21) Appl. No.: 09/836,238

(22) Filed: Apr. 18, 2001

(51) Int. Cl.
- *H04L 9/00* (2006.01)
- *H04L 9/32* (2006.01)
- *G06F 7/04* (2006.01)
- *G06F 7/58* (2006.01)
- *G06F 12/00* (2006.01)

(52) U.S. Cl. .................. 380/278; 713/163; 713/168; 726/6; 726/21

(58) Field of Classification Search ............... 713/155, 713/163, 177, 158, 201, 168; 380/21, 284, 380/278; 726/6, 21
See application file for complete search history.

(56) References Cited

U.S. PATENT DOCUMENTS

| | | | | |
|---|---|---|---|---|
| 5,592,552 A * | 1/1997 | Fiat | ............... | 713/163 |
| 5,630,184 A | 5/1997 | Roper et al. | ............... | 709/221 |
| 5,748,736 A * | 5/1998 | Mittra | ............... | 713/163 |
| 6,049,878 A * | 4/2000 | Caronni et al. | ............... | 713/201 |
| 6,151,395 A | 11/2000 | Harkins | ............... | 380/286 |
| 6,178,244 B1 | 1/2001 | Takeda et al. | ............... | 380/277 |
| 6,226,743 B1 * | 5/2001 | Naor et al. | ............... | 713/177 |
| 6,240,188 B1 * | 5/2001 | Dondeti et al. | ............... | 380/284 |
| 6,275,859 B1 * | 8/2001 | Wesley et al. | ............... | 709/229 |
| 6,295,361 B1 * | 9/2001 | Kadansky et al. | ............... | 380/278 |
| 6,330,671 B1 | 12/2001 | Aziz | ............... | 713/163 |
| 6,397,329 B1 * | 5/2002 | Aiello et al. | ............... | 713/155 |
| 6,483,921 B1 | 11/2002 | Harkins | ............... | 380/286 |
| 6,584,566 B1 * | 6/2003 | Hardjono | ............... | 713/163 |
| 6,606,706 B1 * | 8/2003 | Li | ............... | 713/162 |
| 6,901,510 B1 | 5/2005 | Srivastava | ............... | 713/163 |
| 6,941,457 B1 | 9/2005 | Gundavelli et al. | ............... | 713/163 |
| 2002/0147906 A1 * | 10/2002 | Lotspiech et al. | ............... | 713/158 |

OTHER PUBLICATIONS

D. Balenson et al. Key Management for Large Dynamic Groups: One-Way Function Trees and Amortized Initialization. Internet Draft, Internet Engineering Task Force, Aug. 25, 2000.*

D. Balenson et al. Dynamic Cryptographic Context Management (DCCM). Final Report, Apr. 6, 2000.*

Suvo Mittra. Iolus: A Framework for Scalable Secure Multicasting. 1997. ACM. p. 277-288.*

(Continued)

*Primary Examiner*—Ayaz Sheikh
*Assistant Examiner*—Christian LaForgia
(74) *Attorney, Agent, or Firm*—Zilka-Kotab, PC; Christopher J. Hamaty

(57) ABSTRACT

A system and method for reusable efficient key distribution is disclosed. Key distribution is effected through the application of self-repairing groups that obviate the need for key distribution messages in portions of a hierarchical tree. In one embodiment, the self-repairing group is based on a reusable power set.

20 Claims, 13 Drawing Sheets

OTHER PUBLICATIONS

A. Fiat et al. Broadcast Encryption. 1993. Advances in Cryptology—CRYPTO '93.*

David M. Balenson et al. Dynamic Cryptographic Context Management, Report #4. Apr. 6, 2000, p. i-12.*

David Balenson et al. Key Management for Large Dynamic Groups: One-way Function trees and Amortized Initialization. Mar. 15, 1999. p. 1-14.*

NAI Labs Advanced Research Project Profile: Dynamic Cryptographic Context Management. Jan. 5, 2001. p. 1-2.*

D. Balenson et al. Key Management for Large Dynamic Groups: One-way function trees and amortized initialization. Aug. 25, 2000, p. 1-32.*

RFC 1949, "Scalable Multicast Key Distribution," May 1996.

R. Canetti et al., "Multicast Security: A Taxonomy and Some Efficient Constructions," INFOCOMM '99, Jun. 1999.

D. A. McGrew and A. T. Sherman, "Key Establishment in Large Dynamic Groups Using One-Way Function Trees," May 20, 1998.

D. M. Wallner et al., "Key Management for Multicast: Issues and Architectures," Internet Draft, Internet Engineering Task Force, Sep. 15, 1998.

P. McDaniel et al., "Multicast Security Policy," Internet Draft, Internet Engineering Task Force, May 2000.

D. Balenson et al., "Key Management for Large Dynamic Groups: One-Way Function Trees and Amortized Initialization," Internet Draft, Internet Engineering Task Force, Aug. 25, 2000.

P. S. Kruus, "A Survey of Multicast Security Issues and Architectures," Proceedings 21st National Information Systems Security Conference, Oct. 1998.

P. S. Kruus and J. P. Macker, "Techniques and Issues in Multicast Security," Proceedings IEEE MILCOM '98, Oct. 1998.

D. Balenson et al., "Dynamic Cryptographic Context Management (DCCM)," Final Report, Apr. 6, 2000.

Cryptographic Technologies, Dynamic Cryptographic Context Management (DCCM), printed from http://www.pgp.com/research/nailabs/cryptographic/dynamic-cryptographic.asp.

Lotspiech, J., et al., "Subset-Difference based Key Management for Secure Multicast", IRTF SMUG Internet Draft, (Jul. 2001).

Office Action from U.S. Appl. No. 09/836,214 mailed Nov. 3, 2005.

Restriction Requirement from U.S. Appl. No. 09/836,214 mailed Jul. 13, 2005.

Office Action from U.S. Appl. 09/836,214 mailed Nov. 24, 2004.

* cited by examiner

SYSTEM AND METHOD FOR KEY DISTRIBUTION IN A HIERARCHICAL TREE

The invention was made with Government support under Contract MDA904-00-C-236. The Government has certain rights in this invention.

BACKGROUND

1. Field of the Invention

The present invention relates generally to group keying systems and more particularly to a group key distribution mechanism.

2. Discussion of the Related Art

Secure group communication is gaining in importance, with both military and commercial applications in need of development. In a secure group communication, a trusted key server communicates with a group of N users over a multicast or broadcast communications channel. The trusted key server also communicates with the group of N users through N respective unicast communications channels that enable communications with individual users.

A unicast communications channel can be embodied in various forms. In one example, the unicast communications channel is implemented online protected by a shared secret. In another example, the unicast communications channel is implemented offline through the physical delivery of a floppy disk. A multicast or broadcast channel can also be embodied in various forms, such as a wireless network, the public Internet, a cable network, a satellite network, a hybrid network, or the like.

In a secure group communication, each of the N users is a member of a group that uses a group key to encode and decode group communications. The group key is known to each user and to the key server.

In the normal course, users will frequently join and leave the group. It is therefore important to ensure that only the set of current users has access to a currently valid and secure group key. Specifically, the current group key should be secure against collaborative attacks from past and future users.

Many conventional algorithms are able to use the broadcast channel to communicate information necessary to evict a user or users from the group or to add a user or users to the group. Some conventional algorithms have been adopted that reduce the bandwidth used on the broadcast channel to perform key operations by using a hierarchy of keys assigned to nodes in a tree. These keys are used to communicate update information in an efficient manner when a new group key is needed due to membership changes.

FIG. 1 shows an example of a hierarchical set of keys used to limit the bandwidth required for updating a set of 32 users. Each node in hierarchical tree 100 is associated with a key. The nodes in the bottom row of hierarchical tree 100 are referred to as leaf nodes. The leaf nodes are associated with keys that are unique to individual users $U_0$–$U_{31}$. Specifically, user $U_0$ is associated uniquely with the leftmost node in the bottom row, i.e., the leftmost leaf node; user $U_1$ is associated with the next leaf node; and so on.

Higher nodes in the hierarchy are associated with sets of users, and are referred to as interior nodes. Each interior node is associated with a key known to one or more users that descend from that node. For example, the top most key, key A (the group key), is known by users $U_0$–$U_{31}$ that descend from it, key B is associated with users $U_0$–$U_{15}$ that descend from it, and key D is associated with users $U_0$–$U_7$ that descend from it.

In hierarchical tree 100, each user $U_0$–$U_{31}$ knows the keys corresponding to the path from its leaf node up to the root node A on top. For example, user $U_2$ knows its unique key, and also knows its parent node key K, its grandparent node key H, and higher level node keys D, B, and A. Each user therefore knows one key per level of hierarchical tree 100 on the way to the root node A.

In general, tree hierarchies do not have to be symmetric or binary as illustrated in FIG. 1. Trees can have branching other than binary branching such that each node in the tree can have one or more nodes directly under it. For example, a hierarchical tree can be defined such that an interior node could have four nodes directly under it.

Additionally, hierarchical trees do not have to have a uniform depth. For example, some users could be at leaf nodes on the sixth level, as in hierarchical tree 100, while other users could be at leaf nodes at the eighth, ninth, or tenth levels at other places in the tree.

If a user is evicted, all of the keys the evicted user knows need to be replaced with new keys. This process ensures that only authorized users have access to the secure group communication. For example, in hierarchical tree 100, user $U_0$ is illustrated as being evicted. Therefore, the circled keys, namely keys A, B, D, H, and J, are compromised and need to be replaced. The reason the key uniquely known to user $U_0$ is not circled is that no other user knows that key. Therefore, key $U_0$ will not be used again. If a new user is later added to the group and assigned to user $U_0$'s leaf node, that new user will be assigned a new key uniquely associated with it that cannot be derived from the old user $U_0$'s unique key.

Each non-evicted user that knows a key that is compromised through an eviction must learn the value of the replacement key. One conventional method for communicating new values for compromised keys from a key server to a non-evicted user is the logical key hierarchy (LKH) method, described in section 4.2 of Wallner et al., "Multicast Security: a Taxonomy and Some Efficient Constructions," Sep. 15, 1998, which is hereby incorporated by reference in its entirety. In the LKH method, all compromised keys are generated at the key server, i.e., the key server determines replacement values for them. These values are then communicated in an efficient way to the remaining non-evicted users.

In FIG. 2, the LKH method is illustrated for hierarchical tree 100. Encrypted messages containing replacement keys are sent out, as indicated by the arrows in FIG. 2. The encrypted messages are depicted by arrows pointing at the nodes by whose keys they are encrypted. For example, the message encrypted with key B is depicted by an arrow pointing from node A towards node B. The encrypted message is labeled '$E_B$' to indicate that it is encrypted with key B.

As mentioned previously, the circled keys A, B, D, H, and J need to be replaced. In the LKH method, replacement key distribution begins at the bottom of the tree and progresses upward. In this framework, the first key to be replaced is key J. Key J is known to non-evicted user $U_1$, and so its new value should be given to user $U_1$. The key unique to user $U_1$ is regarded as a leaf node key. Therefore, user $U_1$ receives the new key J through a message $E_{U_1}$ that is encrypted with $U_1$'s leaf node key.

The next key to be replaced is key H. Users $U_1$–$U_3$ should be given the new value of key H. Here, key K is used to communicate the new value of key H to users $U_2$ and $U_3$, while the new key J is used to communicate the new value of key H to user $U_1$. Specifically, user $U_1$ receives the new value of key H through a message $E_J$ that is encrypted with the new key J, while users $U_2$ and $U_3$ receive the new value of key H through a message $E_K$ that is encrypted with key K. Encryption under the new key J prevents evicted users from decrypting message $E_J$ and obtaining the new value of key H.

Users $U_1$–$U_7$ are also given the new value of key D. Users $U_{1-3}$ receive the new key D through a message $E_H$ that is encrypted with the new key H, while users $U_4$–$U_7$ receive the new key D through a message $E_I$ that is encrypted with key I. Next, users $U_1$–$U_{15}$ receive the new value of key B. Users $U_1$–$U_7$ get key B by decrypting message $E_D$, while users $U_8$–$U_{15}$ get key B by decrypting message $E_E$. Finally, users $U_1$–$U_{15}$ get the new group key A by decrypting message $E_B$, while users $U_{16}$–$U_{31}$ get the new group key A by decrypting message $E_C$.

As thus described, the LKH method enables secure distribution of new interior node keys upon eviction of one or more users. Two additional key distribution methods have been proposed to reduce the number of encrypted messages that are needed to a tree update after a single user is evicted. These methods are the one-way function chain (OFC) and one-way function tree (OFT) methods. The OFC method is described in section 4.2 of Canetti et al., "Multicast Security: A Taxonomy and Some Efficient Considerations," Proceedings of IEEE Infocom'99, March 1999, which is hereby incorporated by reference in its entirety. The OFT method is described in McGrew et al., "Key Establishment in Large Dynamic Groups Using One-Way Function Trees," May 20, 1998, which is hereby incorporated by reference in its entirety.

In the OFC method, the messages shown with the dotted arrows in FIG. 2 are eliminated, while the messages with the solid arrows are retained. In the OFT method, the messages are sent to the siblings instead of the children, such that there would be a message from B encrypted to C, from D encrypted to E, from H encrypted to I, from J encrypted to K and from a new $U_0$ to $U_1$. Both OFC and OFT require less messaging because replacement keys are a function of one (in OFC) or both (in OFT) children keys.

It should be noted that it is possible for multiple users to be evicted from the group simultaneously. This could happen, for example, if multiple users are compromised over a period of time and the key server evicts them all at the end of the period of time (e.g., end of a subscription period). This aggregates the eviction process for reasons of efficiency.

For example, suppose that users $U_0$ and $U_{13}$ are evicted simultaneously. As can be seen in FIG. 1, the keys known by evicted user $U_0$ that are known by other users are keys A, B, D, H, and J. The keys known by evicted user $U_{13}$ that are known by other users are keys A, B, E, N, and O. Therefore, keys A, B, D, E, H, J, N, and O should be replaced. This simultaneous double-eviction prevents keys A and B from being replaced twice.

In a large tree encompassing thousands or millions of users, many compromised users could accrue during a time interval. When they are simultaneously evicted after the time interval, there may exist a large number of keys that need to be replaced, particularly toward the bottom of the tree. For example, assume a worst case scenario in which every other user (i.e., users $U_0$, $U_2$, $U_4$, $U_6$, . . . ) is evicted. In a symmetric binary tree having 32 leaf nodes, 16 separate encrypted messages would be required to inform the non-evicted users (i.e., users $U_1$, $U_3$, $U_5$, $U_7$, . . . ) of the replacement keys for the first level of interior nodes above the leaf nodes. Additional encrypted messages would also be required to replace the rest of the compromised keys at higher levels of the tree. This communication cost becomes excessive when the tree encompasses millions of users. What is needed therefore is an efficient group key distribution mechanism.

SUMMARY

A system and method for reusable efficient key distribution is disclosed. Key distribution is effected through the application of self-repairing groups that obviate the need for key distribution messages in portions of a hierarchical tree. In one embodiment, the self-repairing group is based on a reusable power set.

DETAILED DESCRIPTION

An embodiment of the invention is discussed in detail below. While specific implementations are discussed, it should be understood that this is done for illustration purposes only. A person skilled in the relevant art will recognize that other components and configurations may be used without departing from the spirit and scope of the invention.

Figure 1:
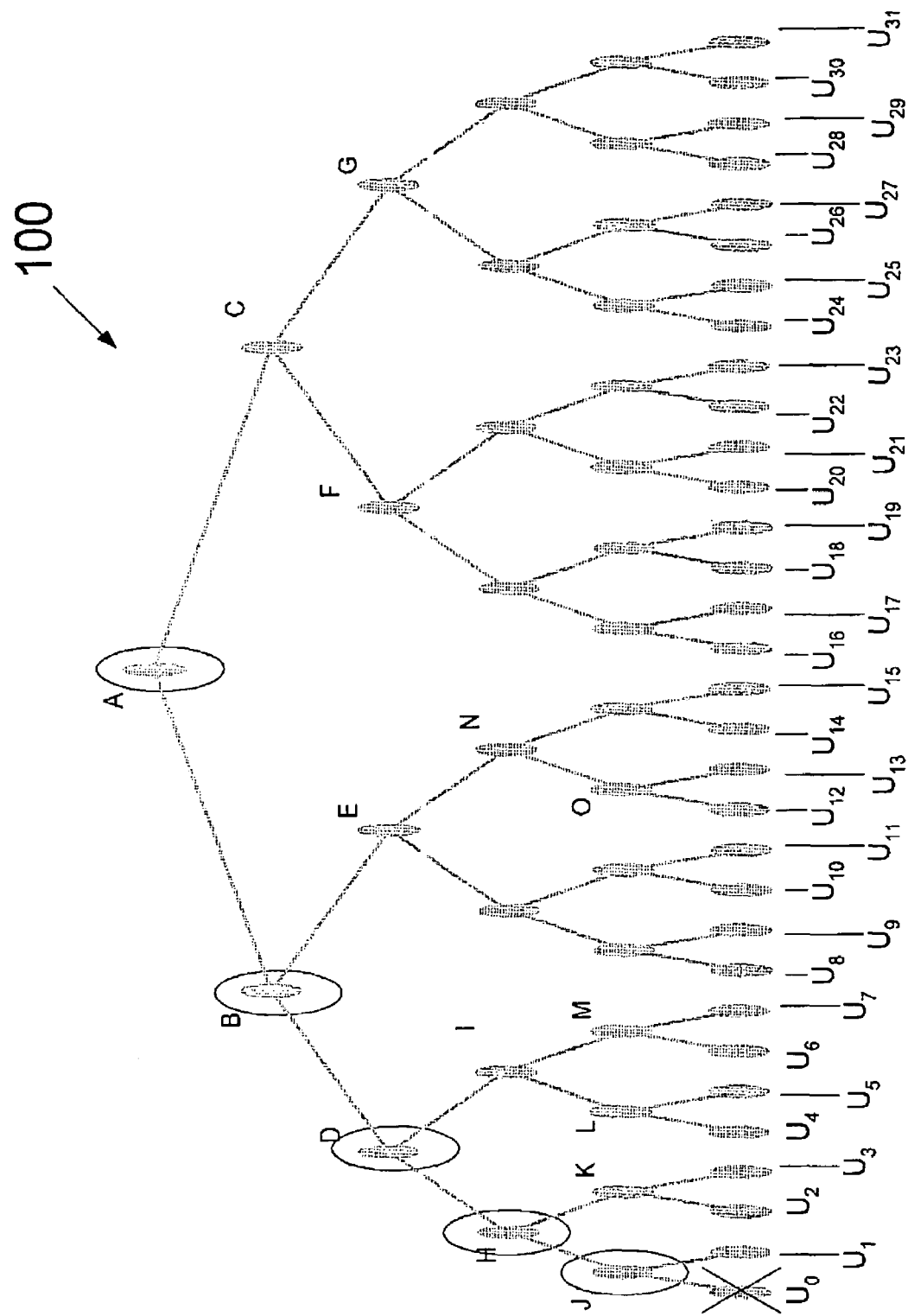
FIG. 1 illustrates a hierarchical tree of nodes.
Figure 2:
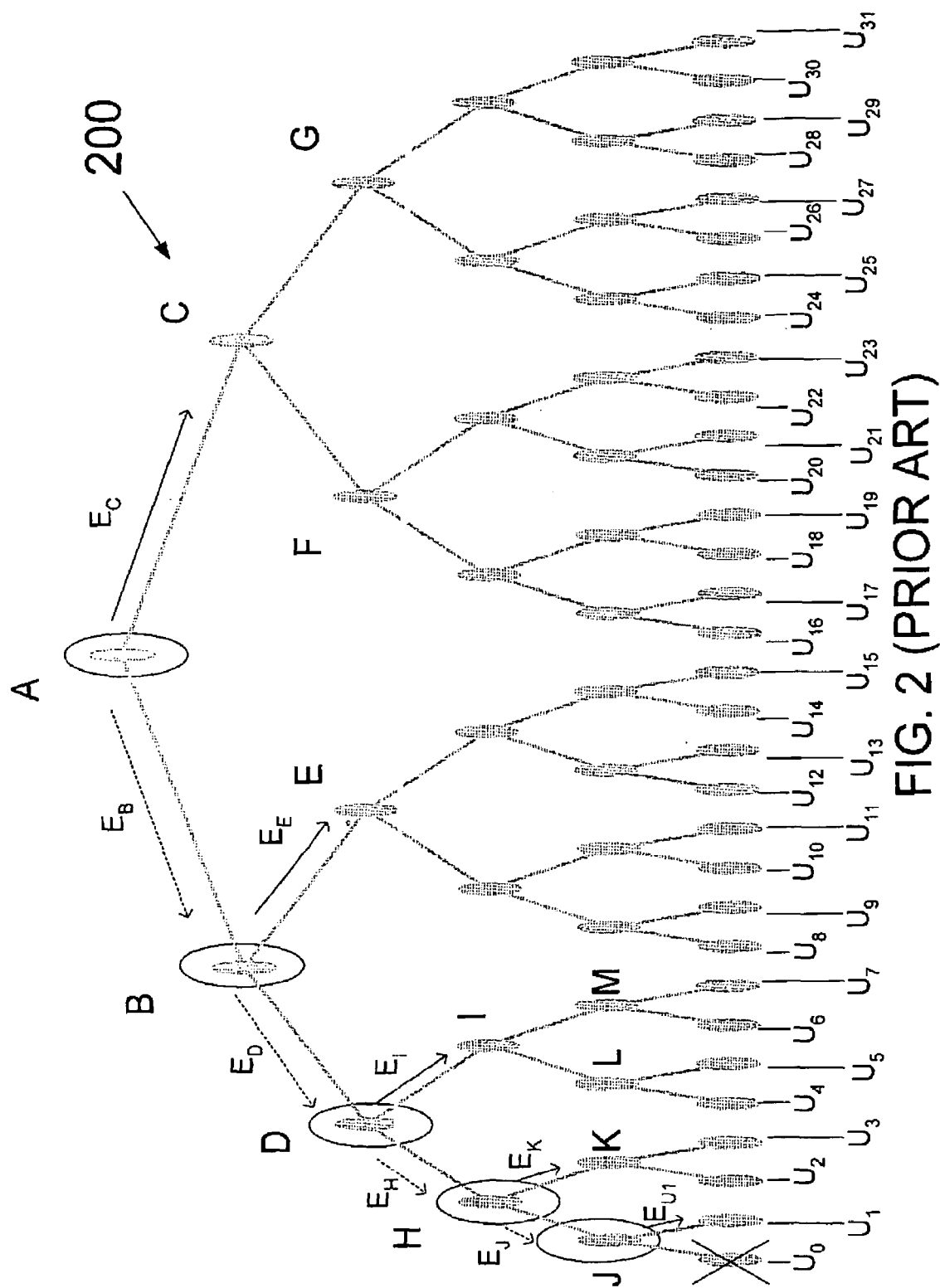
FIG. 2 illustrates an eviction of a user.

The efficiency of group key distribution using hierarchical trees (e.g., a binary tree) can be judged based upon its ability to handle multiple-user evictions. In accordance with the present invention, the impact of multiple-user evictions is reduced through the effective truncation of the hierarchical tree. To illustrate this concept, reference is made first to a portion of hierarchical tree 100 of FIG. 1.

Figure 3B:
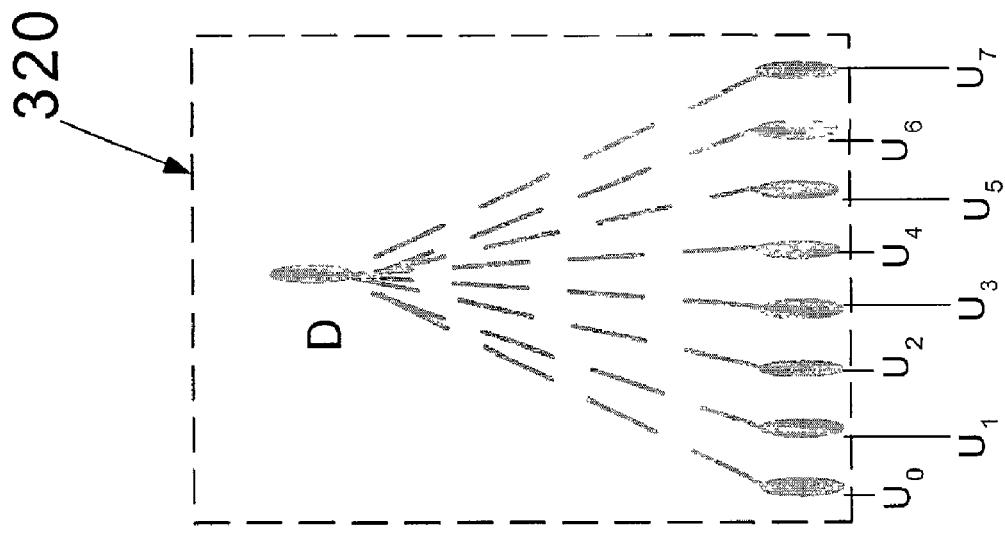
FIGS. 3A and 3B illustrate a self-repairing group.
Figure 3A:
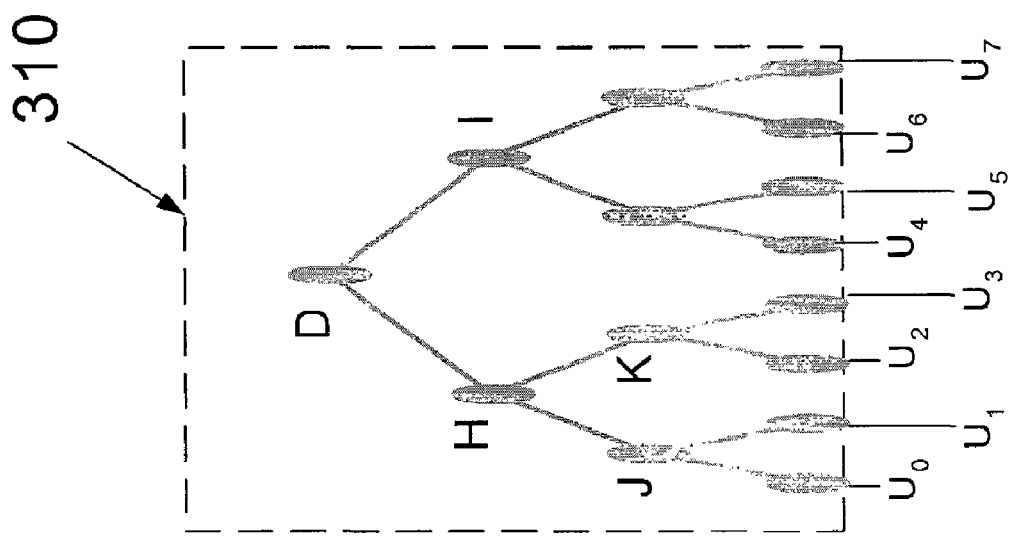

FIG. 3A shows the bottom-left portion of hierarchical tree 100. Specifically, tree portion 310 shows the set of node keys D, H, I, J, K, L, and M that are unique to the set of users $U_0$–$U_7$. As described, in a worst-case eviction scenario where users $U_0$, $U_2$, $U_4$, and $U_6$ are evicted, node keys at the first interior node level (i.e., node keys J, K, L, and M) above the leaf nodes would each be compromised. Encrypted messages updating keys J, K, L, and M would then be sent to users $U_1$, $U_3$, $U_5$, and $U_7$, respectively. Further encrypted messages updating interior nodes at higher levels of the tree would be sent as would be apparent.

In this scenario, the cost of sending encrypted update messages is high. This cost becomes excessive as the number of users increases. Significantly, the bulk of the cost is incurred in updating the interior nodes at the bottom levels of the tree. In accordance with the present invention, the cost of updating interior nodes at the bottom levels of the tree is reduced through the creation of a self-repairing group of users.

The concept of a self-repairing group of users is described with reference to tree portion 320 illustrated in FIG. 3B. Tree portion 320 of FIG. 3B is roughly analogous to tree portion 310 of FIG. 3A in that the set of users $U_0$–$U_7$ shares a common interior node key D.

One of the properties of the self-repairing group is that each of its members can independently update the shared interior node key. Updating of the shared interior node key is not dependent on key distribution messages from the root node that update further node keys descending from the shared interior node key. The elimination of encrypted messages therefore enables the shared interior node key to be generated in a single step.

In the context of FIG. 3B, each of users $U_0$–$U_7$ is able to independently update shared key D. Encrypted key distribution messages that previously updated interior nodes H, I, J, K, L, and M (see FIG. 3A) would not be required. Rather, users $U_0$–$U_7$ can update shared key D in one step. For this reason, users $U_0$–$U_7$ in the self-repairing group of FIG. 3B are illustrated as being connected to node D using dashed lines.

In one embodiment, the updating process is initiated through the transmission of a update request message. This update request message can include the identities of the evicted user(s). Each non-evicted user in the self-repairing group uses this information to recalculate the shared interior node key. A detailed description of an embodiment of a update process is described below in the context of a reusable power set.

Figure 4:
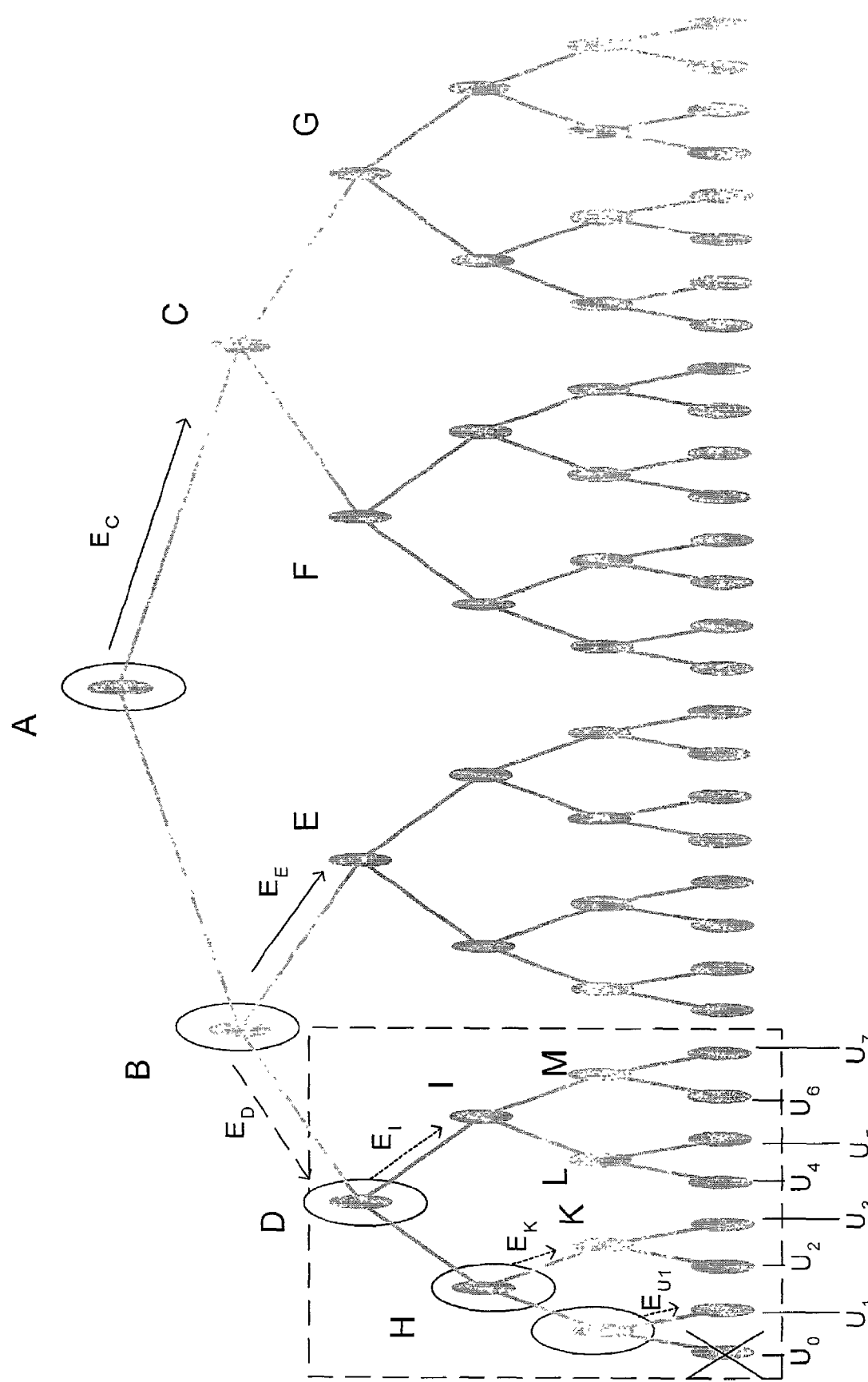
FIG. 4 illustrates update messages for a self-repairing group.

FIG. 4 shows the impact of a self-repairing group on key distribution methods as compared to conventional methods. In FIG. 4, user $U_0$ has been evicted. Therefore, keys A, B, D, H, and J are compromised and need to be replaced. In conventional key distribution methods such as OFT and OFC, encrypted messages $E_{U1}$, $E_K$, $E_I$, $E_E$, and $E_C$ are sent by the root node to update the compromised keys. In particular, the dotted messages $E_{U1}$, $E_K$, and $E_I$ are used by non-evicted users $U_1$–$U_7$ to obtain, in an incremental manner, the new value of key D. The solid messages $E_E$ and $E_C$ are used by the remaining non-evicted users to obtain the new value of group key A.

In accordance with the present invention, dotted messages $E_{U1}$, $E_K$, and $E_I$ are eliminated because users $U_0$–$U_7$, which form a self-repairing group, can independently update key D. This one-step update process for the entire self-repairing group obviates the need for the sequential determination of node keys at levels between node D and the users $U_0$–$U_7$. Interior node keys such as keys H–M are therefore unnecessary for the incremental distribution of information to determine the shared key D.

As further illustrated in FIG. 4, an additional message $E_D$ is shown. This update request message $E_D$, which may be optionally encrypted using key D, is intended for the non-evicted users $U_1$–$U_7$ of the self-repairing group. As noted, the update request message $E_D$ can include a list of evicted members of the self-repairing group that have been evicted. As will be described in greater detail below, the non-evicted members of the self-repairing group can use this list of evicted members to update the common key D in a manner that prevents access by the evicted users. In comparison to conventional methods, this update request message $E_D$, in effect, replaces the encrypted messages $E_{U1}$, $E_K$, and $E_I$, thereby reducing the bandwidth required for key distribution.

In general, the formation of self-repairing groups within a hierarchical tree effectively truncates the tree for the purpose of update messages. The common node of a self-repairing group effectively operates as a leaf node. This leaf-type node dictates that update messages need not be produced by the root node to update nodes beyond the leaf-type node. The interior common node of the self-repairing group is therefore converted into a leaf-type node, effectively truncating the tree.

Figure 5:
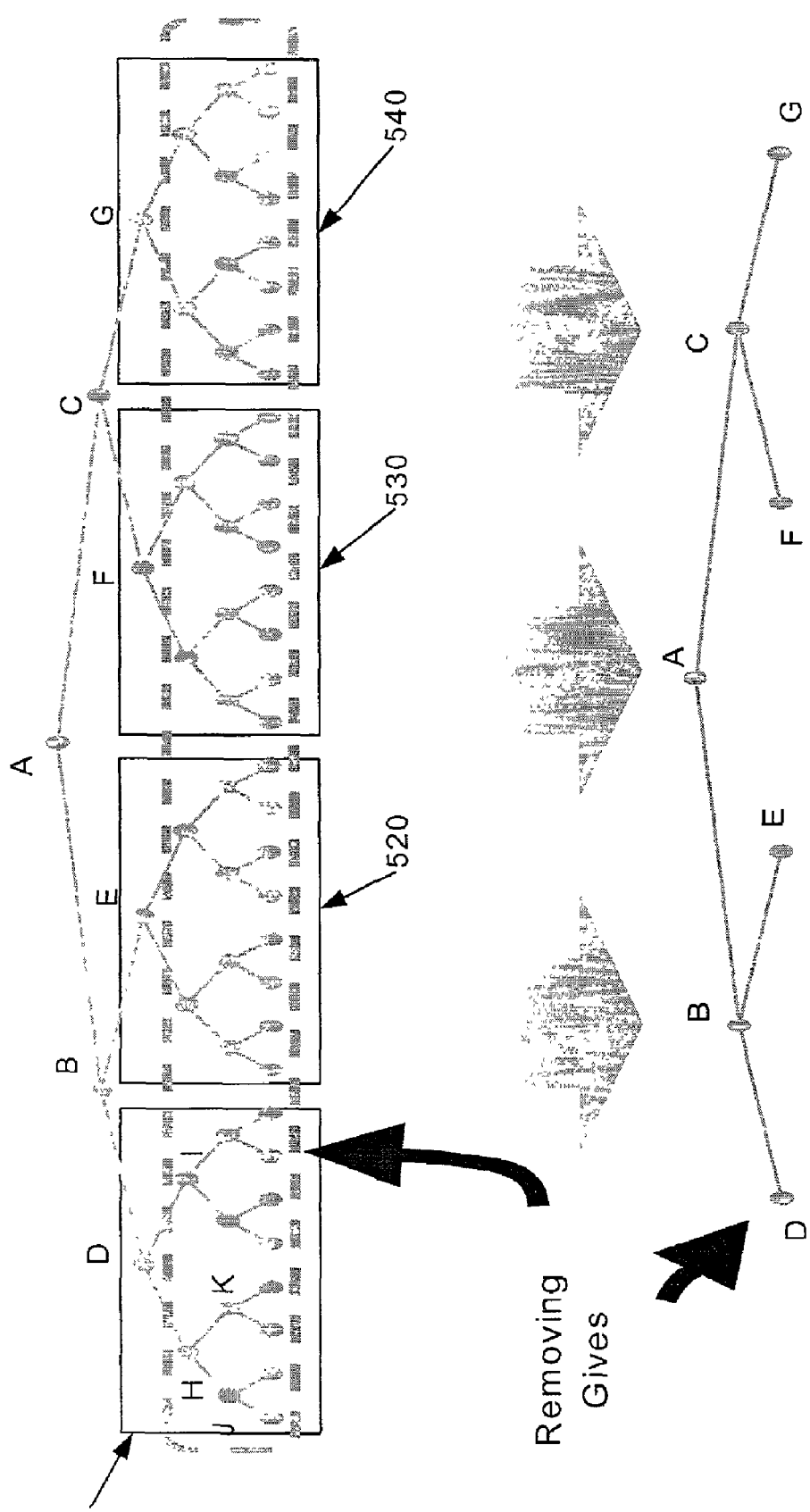
FIG. 5 illustrates a modified hierarchical tree.

FIG. 5 graphically shows the effects of tree-truncation in accordance with the present invention. In this example, assume that users under interior nodes D, E, F, and G are formed into four separate self-repairing groups 510, 520, 530, 540 with eight users each. As each self-repairing group 510, 520, 530, 540 can be represented by a leaf-type node, the tree is effectively cut off at the third level. Levels four through six at the bottom of the tree are eliminated, leaving a truncated tree having nodes A–G.

The elimination of the lowest levels of the tree results in a large cost savings in the distribution of key information. As noted, in a worst-case eviction scenario where every other user is evicted, the number of encrypted messages needed to update the nodes at the first level above the user nodes is equivalent to one-half the number of users. This cost alone becomes prohibitive when the number of users becomes large.

For example, consider a balanced binary tree that supports 8192 users. This balanced binary tree would have 4096 interior nodes at the first level above the leaf nodes. In a worst-case eviction scenario, 4096 encrypted messages would be needed to update those 4096 interior nodes.

In the illustrated example of FIG. 5, the simplified tree with nodes A–G can be thought of as a tree above a set of self-repairing groups instead of the conventional concept of a tree above a set of users. Significantly, the key distribution process of the tree above the self-repairing groups can operate in the same way as the conventional key distribution process of the tree above a set of users. Accordingly, the tree-truncation feature of the present invention can be applied to any hierarchical key distribution scheme (e.g., LKH, OFT, OFC, etc.).

In the illustrated example of FIG. 5, the cost savings can be appreciated when considering the starting point of key distribution messages in the truncated tree. As each of the 8-user self-repairing groups can be represented by a leaf-type node, encrypted update messages would start at the third level of the tree (i.e., nodes D, E, F, and G). The total cost of updating the tree would therefore be equivalent to the cost of updating interior nodes from the third level on up to the first level.

This same cost would be incurred in the updating of the conventional 32-user tree of FIG. 5 after the interior nodes at the fourth and fifth levels have been updated. For the fifth level alone, 16 encrypted messages would be required. This cost, in addition to the updating of the interior nodes at the $4^{th}$ level, would therefore be eliminated if 8-user self-repairing groups were used to truncate the tree.

In general, the application of self-repairing groups to hierarchical trees serves to eliminate the large cost of updating the lowest levels of the tree. The number of levels of eliminated updates is dependent on the size of the self-repairing groups that are used. In the above example, 8-user self-repairing groups were used to eliminate two levels of updates. If 16-user self-repairing groups were used, then three levels of updates are eliminated. Implementation considerations relating to the size of the self-repairing groups are discussed in detail below.

It should also be noted that self-repairing groups can be applied to any type of tree. The tree is not required to be binary or balanced. Self-repairing groups generally can be used to represent any group of users that have a shared node. These groups may also exist at varying levels of the tree.

Having described a general framework for tree truncation, an embodiment of a self-repairing group mechanism is now provided. In one embodiment, the self-repairing group is based on a reusable power set (RPS). As detailed below, the RPS enables a self-repairing group to independently update a shared secret (e.g., an encryption key) when one or more users are evicted.

A RPS uses the power set of the set of users in a group as a basis for group key updates. The set of all subsets of a set is referred to as the power set of that set. To illustrate the concept of power sets, consider the case of N=3 in FIG. 6. In the illustrated example, the group includes three users $U_0$, $U_1$, and $U_2$. The power set of the three-user group contains $2^N=2^3=8$ sets, each of which is a subset of the set of users. Specifically, the power set in this case is $\{\{\ \}, \{U_0\}, \{U_1\}, \{U_0, U_1\}, \{U_2\}, \{U_0, U_2\}, \{U_1, U_2\}, \{U_0, U_1, U_2\}\}$.

In one embodiment described below, the power set minus the empty set $\{\ \}$ is used, thereby leaving a set of $2^N-1$ elements. This set is referred to as the modified power set. Each set in the modified power set has a secret (or key) associated with it. In the following description, the secrets unique to the particular sets are referred to as keys. It should be noted, however, that the shared secrets need not be used to enable secure communications between particular subsets of users. The key associated with set $\{U_1\}$ is denoted as key $K_{U_1}$. For ease of description a binary representation is adopted. In this binary representation, each of the N members of the group is represented by an N-bit binary number with a '1' at its position and a '0' at each other position. User $U_0$'s bit position is the rightmost bit, and user $U_{N-1}$'s bit position is the leftmost bit.

Figure 6:
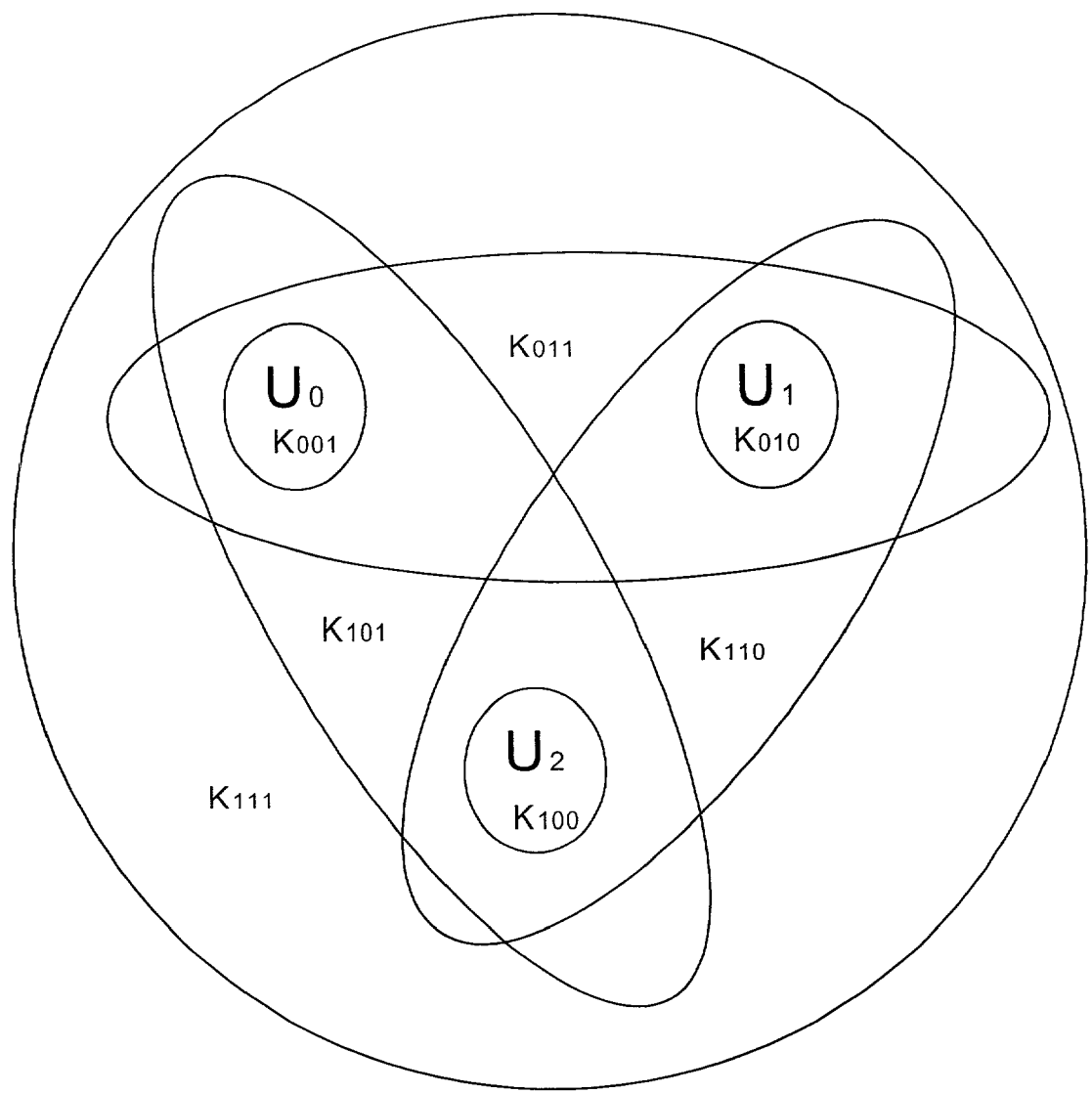
FIGS. 6 and 7 illustrate examples of a power set.

For the case of N=3, therefore, the $\{U_2\}$ element is represented by the binary number (100); the element $\{U_1\}$ is represented by the binary number (010); and the element $\{U_0\}$ is represented by the binary number (001). FIG. 6 shows a Venn diagram illustrating the group of three users $U_0$, $U_1$, and $U_2$ and the modified power set associated with the group. Each set has a key associated with it. For example, the element $\{U_0, U_1\}$ has the key $K_{011}$ associated with it.

For further ease of description, keys are also referred to below using their decimal representation. For example, the key associated with set $\{U_0, U_1\}$ can be denoted in binary as $K_{011}$ or in decimal as $K_3$.

Figure 7:
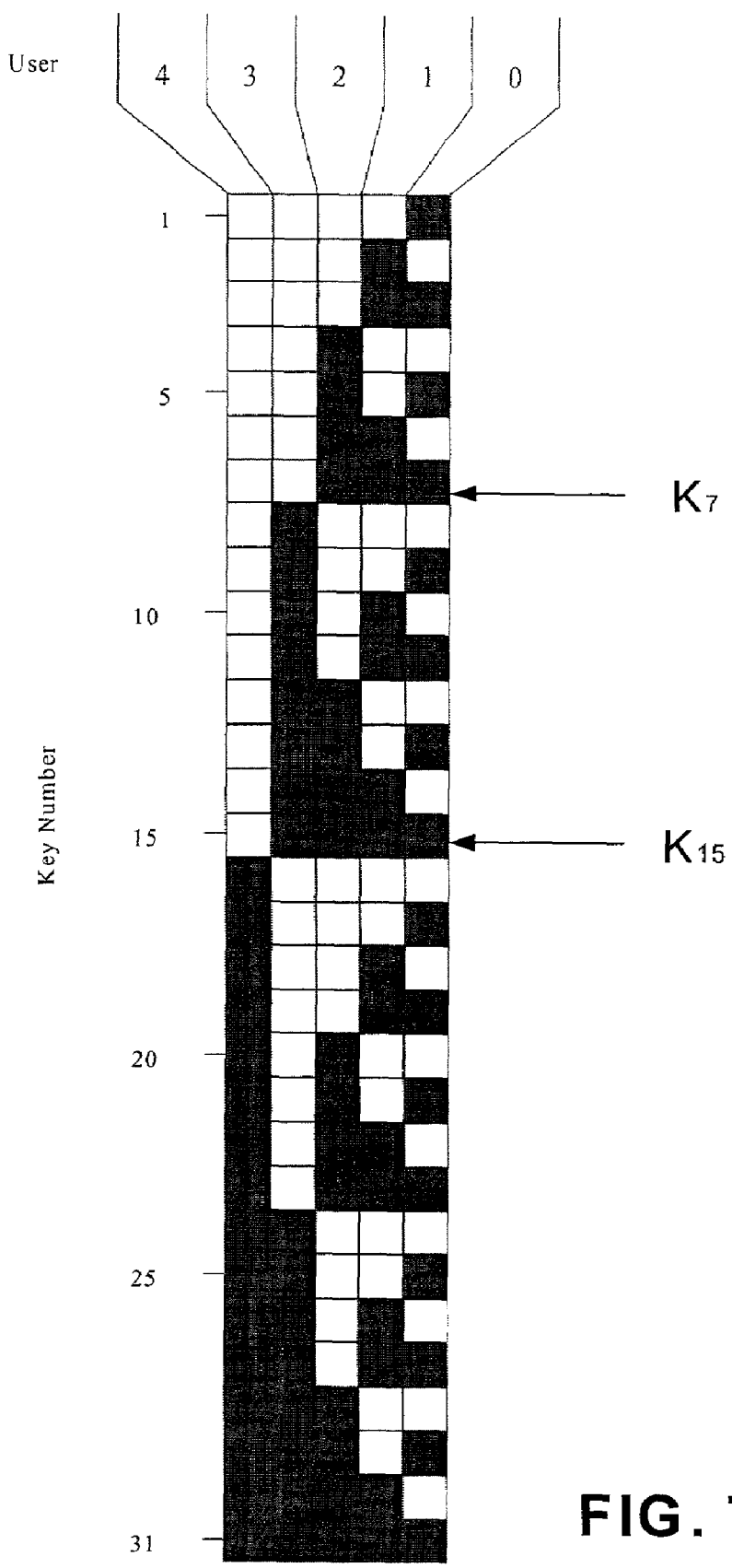

FIG. 7 illustrates the modified power set for a group with N=5 in graphical form. Each row in the figure contains a binary representation of a set in the modified power set, i.e., a binary key number. A solid block represents a '1', and an empty block represents a '0'. Each row contains five blocks, one for each member of the group for the case N=5. The rows are indexed by their decimal equivalent on the left. For example, key number '5' converts to '00101.'

In an embodiment in which the modified power set is used, a group with N members has $2^N-1$ keys associated with it. For example, in FIG. 7, we see that there are $2^5-1=31$ rows, or keys, associated with a group of N=5 members. The trusted key server knows all of the keys associated with a group, but users operate on a need to know basis. A user knows a key if and only if the user is in the set corresponding to the key. Therefore, a user knows only those keys that are associated with sets of which it is a member.

For example, as can be seen in FIG. 7, key number 25 corresponds to '11001' in binary. The solid blocks in the row corresponding to key 25 correspond to users $U_4$, $U_3$, and $U_0$. Therefore, key $K_{25}$ corresponds to set $\{U_0, U_3, U_4\}$, with binary representation (11001). Thus, key $K_{25}$ is known to the key server, user $U_4$, user $U_3$, and user $U_0$. Users $U_1$ and $U_2$ do not know key $K_{25}$ since they are outside of the set $\{U_0, U_3, U_4\}$.

As noted, each user knows a subset of the keys used by the group. As illustrated in FIG. 7, a user knows the set of keys that have the block in that user's particular column filled in. For example, user $U_4$ knows the set of keys that have the leftmost block in their row filled in, i.e., key numbers 16–31, while user $U_3$ knows the set of keys that have their second block filled in, i.e., key numbers 8–15 and 24–31. In a group with N members, each user knows $2^{N-1}$ keys. Therefore, in the N=5 case illustrated in FIG. 7, each user knows $2^{5-1}=16$ keys. The key server knows all $2^N-1=31$ keys.

When a user is evicted from a group, each key that the user knows can no longer be used for secure communications without creating a risk that the evicted user will gain unauthorized access. The set of keys known by the evicted user is said to be compromised. For example, if user $U_3$ is evicted from the group then all of the keys known to user $U_3$ are compromised, i.e., key numbers 8–15 and 24–31.

When a key is compromised, it should be replaced. One possible method of replacement is for the key server to generate a new, substitute key. The key server then communicates the generated key to all users who need to know it. As noted, this communication comes with significant bandwidth costs for new key distribution.

In accordance with the present invention, compromised keys are updated independently and separately by each entity that needs to know it, i.e., by the key server and by each non-evicted user. Each user that needs to know the compromised key, and only those users, should be able to update the compromised key on its own. Evicted users should not be able to collaboratively determine the updated keys.

Figure 8A:
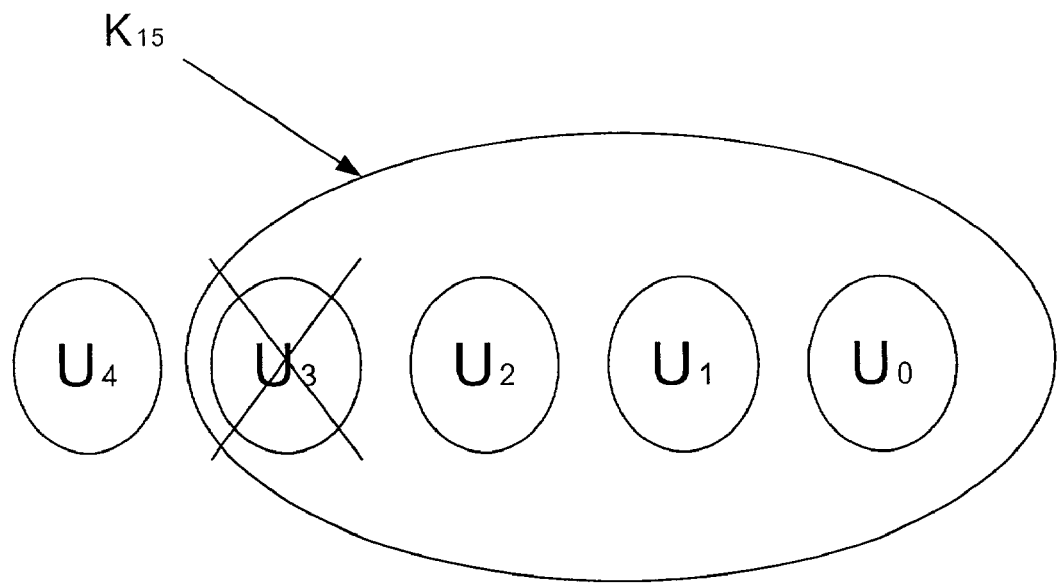
FIGS. 8A, 8B, 9, 10, and 11 illustrate examples of user eviction.

Before discussing an embodiment of a process of updating a key, it will prove useful to analyze the implication of an eviction. Consider the example of FIG. 8A. FIG. 8A shows the set associated with key number 15. As can be seen from FIG. 7, 15 is '01111' in binary, so the set corresponding to key number 15 is $\{U_0, U_1, U_2, U_3\}$. FIG. 8A also shows user $U_3$ as crossed out, indicating that user $U_3$ has been evicted.

Figure 8B:
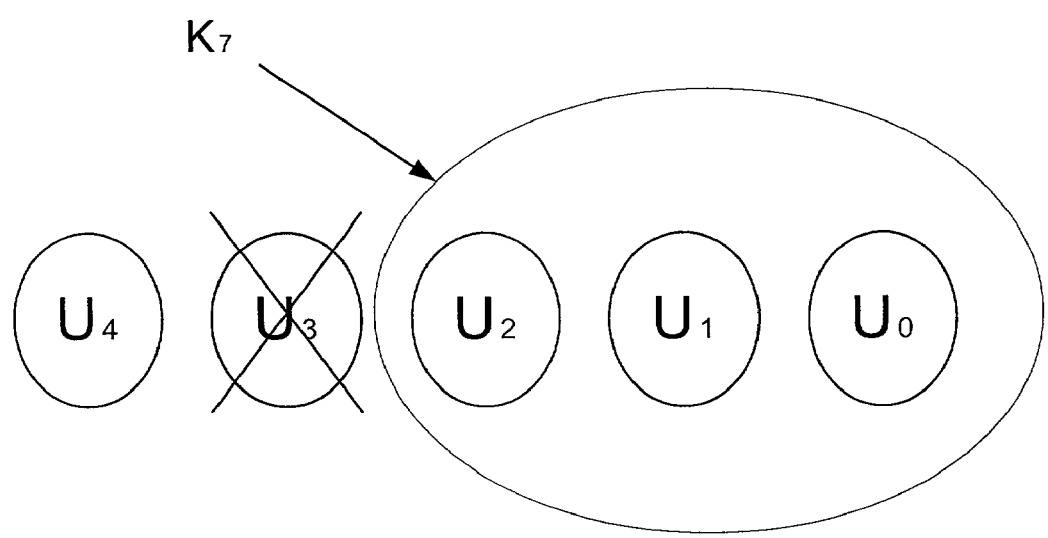

It is the eviction of user $U_3$ that has compromised the key $K_{15}$. The rest of the set that would be left over if user $U_3$ were to be removed would be $\{U_0, U_1, U_2\}$. FIG. 8B shows the resulting subset $\{U_0, U_1, U_2\}$. The key associated with that subset, $K_7$, is not compromised because it does not contain evicted user $U_3$. Significantly, key $K_7$ is known to each non-evicted user in the set $\{U_0, U_1, U_2, U_3\}$ associated with compromised key $K_{15}$, i.e., it is known to users $U_0$, $U_1$, and $U_2$, but not user $U_3$. Additionally, it is not known to any users that are not in the set associated with compromised key $K_{15}$, i.e., it is not known to user $U_4$.

In one embodiment, each compromised key is updated by the key server and the non-evicted users. A key can be updated by using one or more keys to generate a replacement key. In order to prevent any possible collusion among evicted members to obtain the updated key, at least one of the keys used to generate a replacement key should be an uncompromised key.

A candidate to use as an uncompromised key to generate a replacement for a compromised key would be the key known to every non-evicted user in the set associated with the compromised key. As shown in FIGS. 8A and 8B, when user $U_3$ is evicted from the group, thereby compromising key $K_{15}$, key $K_7$ is the key known to every non-evicted user in the set associated with compromised key $K_{15}$. Key $K_7$ is therefore a candidate to use to regenerate key $K_{15}$ following the eviction of user $U_3$. It is worth noting that keys $K_{15}$ and $K_{31}$ are also known to every non-evicted user in the set associated with the compromised key; however, those keys are also known to other non-evicted users, which could lead to security problems. Therefore, in one embodiment, a key used to update a compromised key is the key known only by all of the non-evicted users that also know the compromised key.

Figure 9:
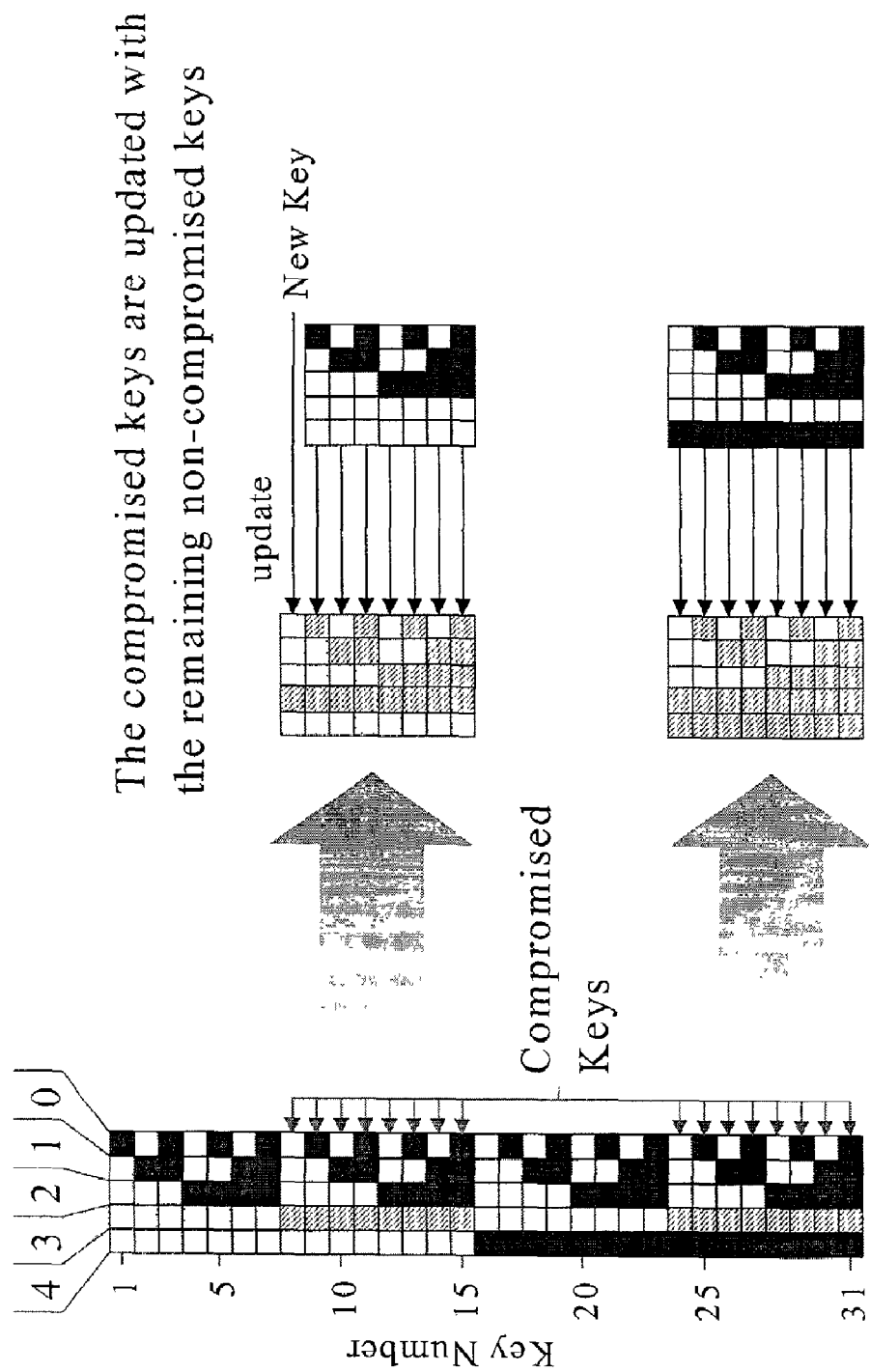

FIG. 9 shows the impact of an eviction of user $U_3$ on all of the keys. As noted, when user $U_3$ is evicted, key numbers 8–15 and 24–31 are compromised. In one embodiment, each compromised key that is known by a non-evicted user should be updated. Specifically, key numbers 9–15 and 24–31 should be updated. Key $K_8$ is not known to any non-evicted users, so it does not need to be updated. Key $K_8$ may be generated by the key server and assigned to a new user that subsequently occupies user $U_3$'s slot.

A compromised key may be updated using the key known only to all of the non-evicted users in the set associated with the compromised key. An example of this condition was illustrated in FIGS. 8A and 8B. Here, key $K_{15}$, which is known by non-evicted users $U_0$, $U_1$, and $U_2$ as well as evicted user $U_3$, is updated using key $K_7$, which is known only to non-evicted users $U_0$, $U_1$, and $U_2$. Similarly, key $K_{12}$, which is known by non-evicted user $U_2$ as well as evicted user $U_3$, is updated using key $K_4$, which is known only to non-evicted user $U_2$.

As shown in FIG. 9, there are two blocks of compromised keys: key numbers 8–15 and 24–31. Key $K_8$ is not known to any non-evicted users, so it does not need to be updated. Keys $K_9$–$K_{15}$ are updated using the respective keys in which user $U_3$ has been removed from the set associated with the key, namely keys $K_1$–$K_7$, respectively. Similarly, keys $K_{24}$–$K_{31}$, are updated using keys $K_{16}$–$K_{23}$, respectively.

Figure 10:
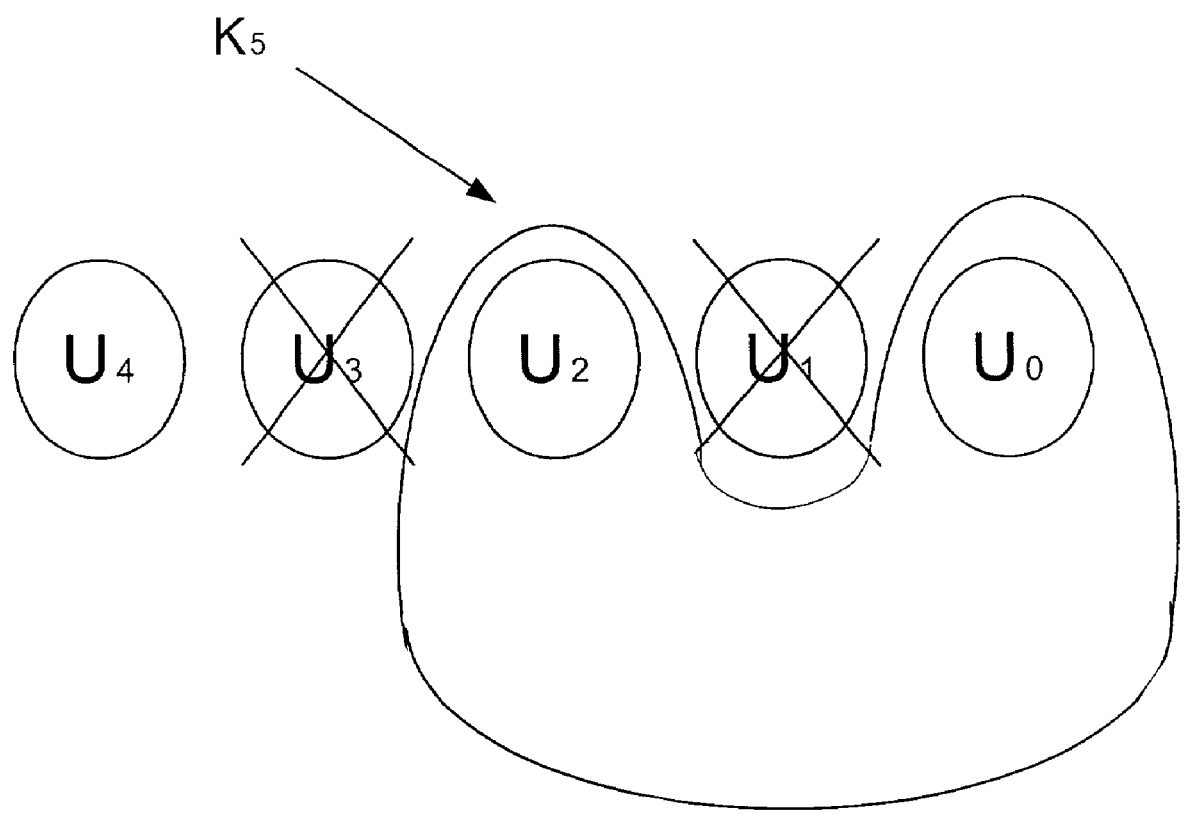

FIG. 10 illustrates the effect of a double eviction. Specifically, FIG. 10 illustrates the effect of a simultaneous eviction of users $U_1$ and $U_3$ on key $K_{15}$. FIG. 10 shows that when evicted users $U_1$ and $U_3$ are removed from the set associated with key $K_{15}$, the remaining set is $\{U_0, U_2\}$, the set associated with key $K_5$. Because $K_5$ is the key known only by the non-evicted users that also know compromised key $K_{15}$, it can be used to updated key $K_{15}$.

Figure 11:
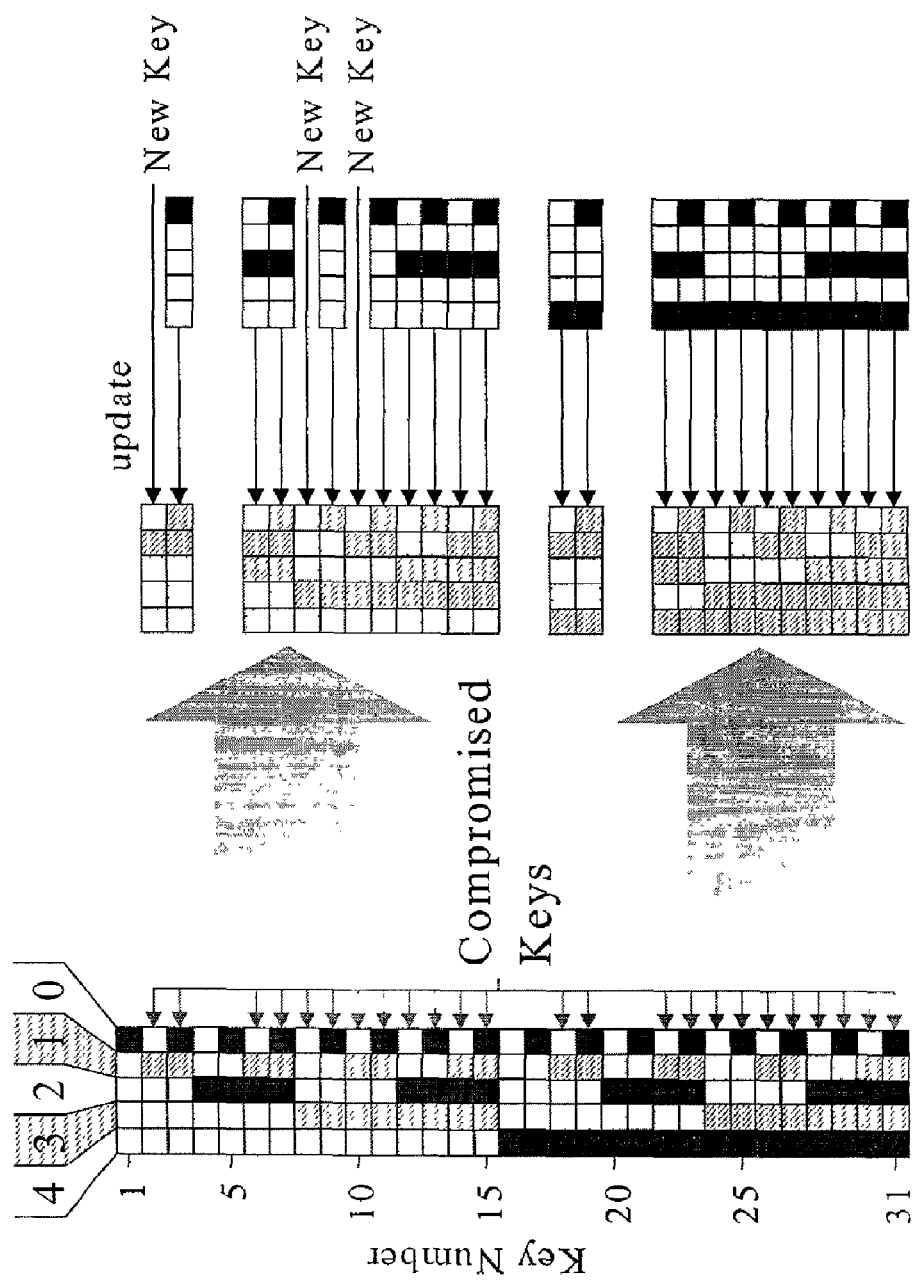

FIG. 11 illustrates the effect of the simultaneous eviction of users $U_1$ and $U_3$ on the entire set of keys. In this case, the only uncompromised keys are keys $K_1$, $K_4$, $K_5$, $K_{16}$, $K_{17}$, $K_{20}$, and $K_{21}$. The remaining keys need to be updated.

Of the remaining keys, keys $K_2$, $K_8$, and $K_{10}$ aren't updated because they are not known by any non-evicted users. Here, it is useful to observe that if a compromised key is to be generated, i.e., if it corresponds to a set containing only evicted users, then the set of non-evicted users that also know the compromised key is the empty set. There is therefore no key corresponding to the empty set. Accordingly, none of the keys can be used to update the compromised key.

In a similar fashion to the single eviction case, the key used to update a compromised key is the key known only by all of the non-evicted users that also know the compromised key. FIG. 11 shows the compromised keys and the respective uncompromised keys used to update them. As described with reference to FIG. 10, key $K_5$ is used to update key $K_{15}$.

Figure 12:
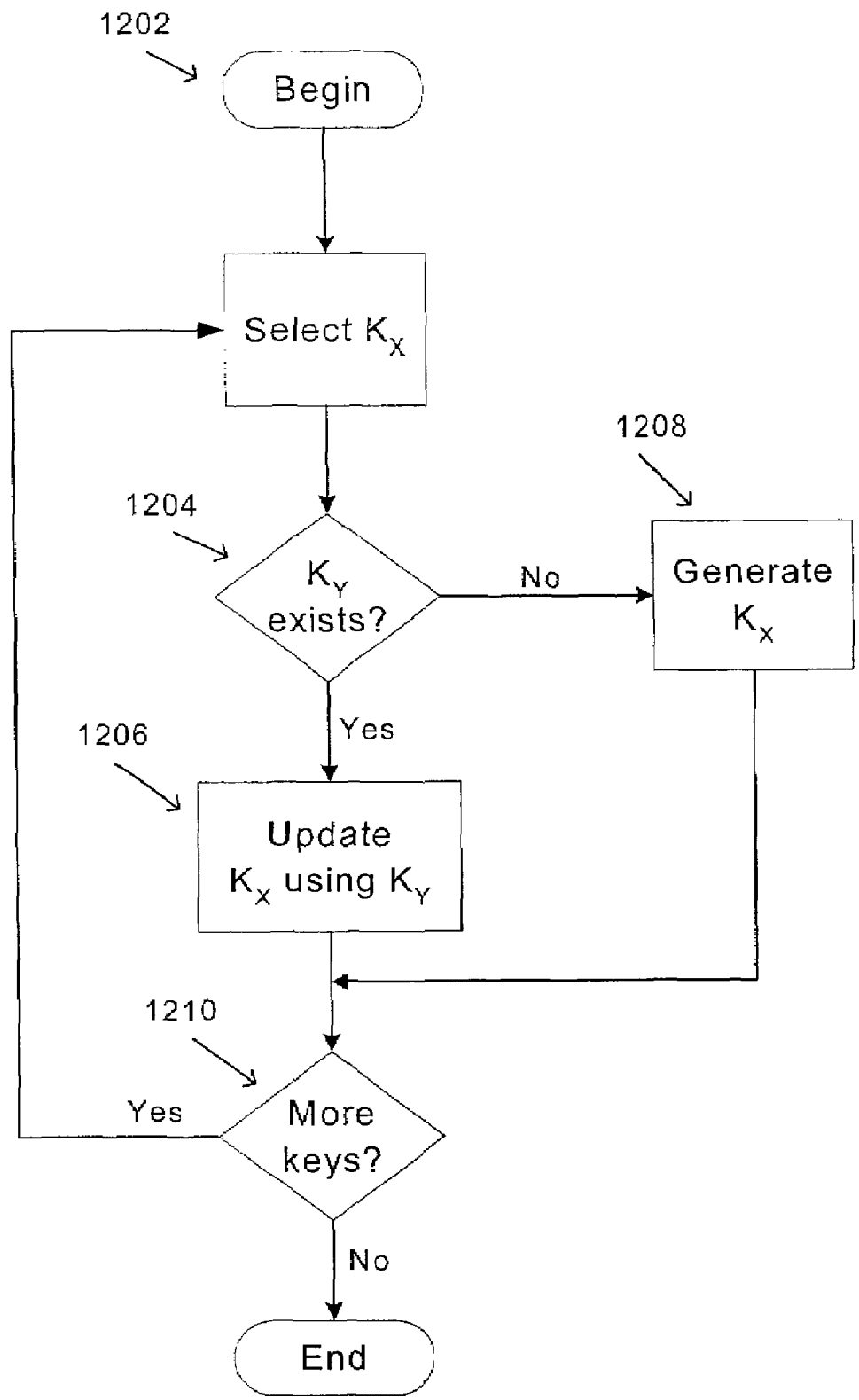
FIG. 12 illustrates a process for updating compromised keys.

The process of updating and generating keys is illustrated in the flowchart of FIG. 12. In the illustrated embodiment, the process begins at step 1202 with the selection of a compromised key $K_x$, where x is an integer between 1 and $2^N-1$. For the compromised key $K_x$, it is then determined at step 1204 whether a key $K_y$ exists. Here, $K_y$ is the key known only by all of the non-evicted users that also know $K_x$. In the double eviction example of FIG. 10, where users $U_1$ and $U_3$ were evicted, key $K_{15}$ can be updated using key $K_5$. Key $K_5$ is the key known only by the non-evicted users that also know compromised key $K_{15}$.

If, at step 1204, key $K_y$ is determined to exist, then key $K_x$ is updated using KY at step 1206. If, at step 1204, key $K_y$ is determined not to exist, then a new key $K_x$ is generated by the key server. As noted above, the generation of new keys occurs when the compromised key $K_x$ is known only by the evicted user(s). For example, in the double eviction scenario of FIG. 11, new keys $K_2$, $K_8$, and $K_{10}$ would need to be generated by the key server.

After key $K_x$ is either updated or replaced by a newly generated key, the process then proceeds to step 1210 where it is determined whether more compromised keys need to be processed. If more compromised keys need to be processed, then the process loops back to step 1202.

The procedure of FIG. 12 is used by the key server, which knows all $2^N-1$ keys. A non-evicted user that knows a compromised key also updates the compromised key. It should be noted that a non-evicted user will not know any key that should be newly generated by the key server because a key that should be generated is not known to any non-evicted users. Therefore, the procedure used by a non-evicted user to process a compromised key $K_x$ is the same as the procedure used by the key server except that the failure to find a key $K_y$ will not result in an action by the non-evicted user. Only the key server generates keys.

In one embodiment, non-evicted users are sent information about the identities of the users that are evicted. Using this information, each non-evicted user then updates the compromised keys that it knows. The key server also updates all compromised keys. This results in a consistent, uncompromised updated key set.

As noted, in one embodiment, a key used to update a compromised key is the key known only by the non-evicted users that also know the compromised key. In one embodiment, the update of compromised keys is performed through a function with the following three properties: (1) knowledge of the updated key does not give knowledge of the compromised key or the updating key, (2) knowledge of the compromised key does not give knowledge of the updated key, (3) knowledge of the compromised key and the updated key does not give knowledge of the updating key. A function with these properties will deny access to evicted users and control access by valid users. A cryptographic one-way function has these features. In general, a cryptographic one-way function is a function that does not have an easily computable inverse or easily computable collisions (collisions are where two input values give the same output value). For example, if F( ) is a one-way function, we could update compromised key $K_x$ with $F(K_y)$.

The following example illustrates a security breach that would result from using an invertible, rather than a one-way function. Suppose, as in FIG. 9, that user $U_3$ is evicted. As described above, key $K_{15}$ is preferably updated using key $K_7$. Suppose an invertible function f( ) is used and key $K_{15}$ is updated with $f(K_7)$. A new user that comes in and is assigned to slot 3 as the new user $U_3$ will be given the new key $K_{15}=f(K_7)$. Because key $K_7$ was not compromised, it is still used. Therefore, if f( ) is an invertible function, the new user $U_3$ will be able to invert key $K_{15}$ to obtain key $K_7$. Because $U_3$ is not a member of the set associated with key $K_7$, this results in a security breach. Therefore, if a function is used, it should be a one-way, or noninvertible, function.

Another example illustrates a security breach that would result from using $F(K_y)$ to replace $K_x$. Suppose, as in FIG. 11, that users $U_1$ and $U_3$ are evicted. As a result, numerous keys are compromised, including keys $K_7$, $K_{13}$, and $K_{15}$, with binary representations (00111), (01101), and (01111), respectively. The same key having a binary representation (00101) is used to update each of these three compromised keys. Therefore, the replacement values for each of keys $K_7$, $K_{13}$, and $K_{15}$ is the same, $F(K_5)$.

Thus, even if a one-way function is used, it will need more than one input to prevent the problem just described. In one embodiment, a one-way function with multiple inputs (e.g., two) is used. Because it is preferred to use key $K_y$ in updating key $K_x$, one of the two inputs could be $K_y$. The other input(s) could be used to obtain uniqueness. For example 'x,' the numeric value of the set corresponding to the compromised key, could be used. Key $K_x$ could therefore be updated with $F(x, K_y)$, where $F(\ )$ again is a one-way function. While the use of 'x' would provide uniqueness, the updated keys may be subject to security risks due to the possible non-confidentiality of the value 'x.'

Thus, in one embodiment, the input to the one-way function is a unique pair of keys (or other data values) that are known only to the non-evicted users that know the compromised key $K_x$. In this embodiment, the updated value of a compromised key $K_x$ is based on $F(K_x, K_y)$. This ensures that each replacement key will be unique, that only authorized users will know it, and that it will not be useable by a new user to obtain keys not authorized to that user.

As noted above, the function F need not be a one-way function. Any function having the properties of (1) knowledge of $F(K_x, K_y)$ does not give knowledge of $K_x$ or $K_y$, (2) knowledge of $K_x$ does not give any knowledge of $F(K_x, K_y)$, and (3) knowledge of $F(K_x, K_y)$ and $K_x$ does not give any knowledge of $K_y$, can be used.

Significantly, no collection of past, present, and future users can collaborate to find any key not known to a member of the collection. The following example shows how, after a sequence of two evictions, the two evicted users cannot collude to obtain any keys. For ease of explanation, the set of keys after the first eviction are denoted K', and the set of keys after the second eviction are denoted K''. In this example, the group includes four users $U_0$, $U_1$, $U_2$, and $U_3$. User $U_3$ is evicted first, followed by the eviction of user $U_2$. The initial state of the system is illustrated in Table 1.

TABLE 1

| | $U_3$ | $U_2$ | $U_1$ | $U_0$ |
|---|---|---|---|---|
| Key 1 ($K_{0001}$) | 0 | 0 | 0 | 1 |
| Key 2 ($K_{0010}$) | 0 | 0 | 1 | 0 |
| Key 3 ($K_{0011}$) | 0 | 0 | 1 | 1 |
| Key 4 ($K_{0100}$) | 0 | 1 | 0 | 0 |
| Key 5 ($K_{0101}$) | 0 | 1 | 0 | 1 |
| Key 6 ($K_{0110}$) | 0 | 1 | 1 | 0 |
| Key 7 ($K_{0111}$) | 0 | 1 | 1 | 1 |
| Key 8 ($K_{1000}$) | 1 | 0 | 0 | 0 |
| Key 9 ($K_{1001}$) | 1 | 0 | 0 | 1 |
| Key 10 ($K_{1010}$) | 1 | 0 | 1 | 0 |
| Key 11 ($K_{1011}$) | 1 | 0 | 1 | 1 |
| Key 12 ($K_{1100}$) | 1 | 1 | 0 | 0 |
| Key 13 ($K_{1101}$) | 1 | 1 | 0 | 1 |
| Key 14 ($K_{1110}$) | 1 | 1 | 1 | 0 |
| Key 15 ($K_{1111}$) | 1 | 1 | 1 | 1 |

As illustrated, each user $U_0$, $U_1$, $U_2$, and $U_3$ maintains those keys that are identified by a '1' in that user's respective column. For example, user $U_3$ Maintains copies of key numbers 8–15.

The first eviction that occurs is the eviction of user $U_3$. The keys 8–15 belonging to user $U_3$ are marked as compromised in Table 2.

TABLE 2

| | $U_3$ | $U_2$ | $U_1$ | $U_0$ | |
|---|---|---|---|---|---|
| Key 1 ($K_{0001}$) | 0 | 0 | 0 | 1 | |
| Key 2 ($K_{0010}$) | 0 | 0 | 1 | 0 | |
| Key 3 ($K_{0011}$) | 0 | 0 | 1 | 1 | |
| Key 4 ($K_{0100}$) | 0 | 1 | 0 | 0 | |
| Key 5 ($K_{0101}$) | 0 | 1 | 0 | 1 | |
| Key 6 ($K_{0110}$) | 0 | 1 | 1 | 0 | |
| Key 7 ($K_{0111}$) | 0 | 1 | 1 | 1 | |
| Key 8 ($K_{1000}$) | 1 | 0 | 0 | 0 | Compromised |
| Key 9 ($K_{1001}$) | 1 | 0 | 0 | 1 | Compromised |
| Key 10 ($K_{1010}$) | 1 | 0 | 1 | 0 | Compromised |
| Key 11 ($K_{1011}$) | 1 | 0 | 1 | 1 | Compromised |
| Key 12 ($K_{1100}$) | 1 | 1 | 0 | 0 | Compromised |
| Key 13 ($K_{1101}$) | 1 | 1 | 0 | 1 | Compromised |
| Key 14 ($K_{1110}$) | 1 | 1 | 1 | 0 | Compromised |
| Key 15 ($K_{1111}$) | 1 | 1 | 1 | 1 | Compromised |

In response to the eviction of user $U_3$, the key server notifies the non-evicted users $U_0$, $U_1$, and $U_2$ that user $U_3$ has been evicted. Then, the key server updates compromised keys 9–15, and generates new key 8.

Upon notification of the eviction of user $U_3$, each non-evicted user also updates the compromised keys that it knows. Specifically, user $U_2$ updates keys 12–15, user $U_1$ updates keys 10, 11, 14, and 15, and user $U_0$ updates keys 9, 11, 13, and 15. Table 3 illustrates the replacement values for each of the compromised keys. The compromised keys are highlighted with an asterisk.

TABLE 3

| | $U_3$ | $U_2$ | $U_1$ | $U_0$ | Updated Key Value |
|---|---|---|---|---|---|
| Key 1 | 0 | 0 | 0 | 1 | $K'_{0001} = K_{0001}$ (Unchanged) |
| Key 2 | 0 | 0 | 1 | 0 | $K'_{0010} = K_{0010}$ (Unchanged) |
| Key 3 | 0 | 0 | 1 | 1 | $K'_{0011} = K_{0011}$ (Unchanged) |
| Key 4 | 0 | 1 | 0 | 0 | $K'_{0100} = K_{0100}$ (Unchanged) |
| Key 5 | 0 | 1 | 0 | 1 | $K'_{0101} = K_{0101}$ (Unchanged) |
| Key 6 | 0 | 1 | 1 | 0 | $K'_{0110} = K_{0110}$ (Unchanged) |
| Key 7 | 0 | 1 | 1 | 1 | $K'_{0111} = K_{0111}$ (Unchanged) |
| Key 8* | 1 | 0 | 0 | 0 | $K'_{1000}$ = New_Key$_1$ |
| Key 9* | 1 | 0 | 0 | 1 | $K'_{1001} = F(K_{1001}, K_{0001})$ |
| Key 10* | 1 | 0 | 1 | 0 | $K'_{1010} = F(K_{1010}, K_{0010})$ |
| Key 11* | 1 | 0 | 1 | 1 | $K'_{1011} = F(K_{1011}, K_{0011})$ |
| Key 12* | 1 | 1 | 0 | 0 | $K'_{1100} = F(K_{1100}, K_{0100})$ |
| Key 13* | 1 | 1 | 0 | 1 | $K'_{1101} = F(K_{1101}, K_{0101})$ |
| Key 14* | 1 | 1 | 1 | 0 | $K'_{1110} = F(K_{1110}, K_{0110})$ |
| Key 15* | 1 | 1 | 1 | 1 | $K'_{1111} = F(K_{1111}, K_{0111})$ |

As illustrated, keys 1–7 are not compromised and are therefore left unchanged. Key 8 is compromised and is generated by the key server. Keys 9–15 are compromised and are updated. The new values for the updated keys are based on $F(K_x, K_y)$, where $F(\ )$ is a one-way function. As noted above, $K_x$ is the compromised key, while $K_y$ is the key known only to the non-evicted users that also know the compromised key.

At this point, a new user is added to the group by the key server distributing the updated K' keys to the new user. The old evicted user $U_3$ cannot masquerade as a member of the group because the evicted user $U_3$ has no keys in common with any group member.

Now, suppose that user $U_2$ is evicted. The keys belonging to user $U_2$ are marked as compromised in Table 4.

TABLE 4

| | $U_3$ | $U_2$ | $U_1$ | $U_0$ | Current Value | |
|---|---|---|---|---|---|---|
| Key 1 | 0 | 0 | 0 | 1 | $K'_{0001} = K_{0001}$ | |
| Key 2 | 0 | 0 | 1 | 0 | $K'_{0010} = K_{0010}$ | |
| Key 3 | 0 | 0 | 1 | 1 | $K'_{0011} = K_{0011}$ | |
| Key 4 | 0 | 1 | 0 | 0 | $K'_{0100} = K_{0100}$ | Compromised |
| Key 5 | 0 | 1 | 0 | 1 | $K'_{0101} = K_{0101}$ | Compromised |
| Key 6 | 0 | 1 | 1 | 0 | $K'_{0110} = K_{0110}$ | Compromised |
| Key 7 | 0 | 1 | 1 | 1 | $K'_{0111} = K_{0111}$ | Compromised |
| Key 8 | 1 | 0 | 0 | 0 | $K'_{1000} = New\_Key_1$ | |
| Key 9 | 1 | 0 | 0 | 1 | $K'_{1001} = F(K_{1001}, K_{0001})$ | |
| Key 10 | 1 | 0 | 1 | 0 | $K'_{1010} = F(K_{1010}, K_{0010})$ | |
| Key 11 | 1 | 0 | 1 | 1 | $K'_{1011} = F(K_{1011}, K_{0011})$ | |
| Key 12 | 1 | 1 | 0 | 0 | $K'_{1100} = F(K_{1100}, K_{0100})$ | Compromised |
| Key 13 | 1 | 1 | 0 | 1 | $K'_{1101} = F(K_{1101}, K_{0101})$ | Compromised |
| Key 14 | 1 | 1 | 1 | 0 | $K'_{1110} = F(K_{1110}, K_{0110})$ | Compromised |
| Key 15 | 1 | 1 | 1 | 1 | $K'_{1111} = F(K_{1111}, K_{0111})$ | Compromised |

As shown in Table 4, keys 4–7 and 12–15 are compromised by the eviction of user $U_2$. Table 5 shows the subsequent key update.

TABLE 5

| | $U_3$ | $U_2$ | $U_1$ | $U_0$ | Updated Key Value |
|---|---|---|---|---|---|
| Key 1 | 0 | 0 | 0 | 1 | $K''_{0001} = K'_{0001} = K_{0001}$ (Unchanged) |
| Key 2 | 0 | 0 | 1 | 0 | $K''_{0010} = K'_{0010} = K_{0010}$ (Unchanged) |
| Key 3 | 0 | 0 | 1 | 1 | $K''_{0011} = K'_{0011} = K_{0011}$ (Unchanged) |
| Key 4* | 0 | 1 | 0 | 0 | $K''_{0100} = New\_Key_2$ |
| Key 5* | 0 | 1 | 0 | 1 | $K''_{0101} = F(K'_{0101}, K'_{0001})$ |
| | | | | | $= F(K_{0101}, K_{0001})$ |
| Key 6* | 0 | 1 | 1 | 0 | $K''_{0110} = F(K'_{0110}, K'_{0010})$ |
| | | | | | $= F(K_{0110}, K_{0010})$ |
| Key 7* | 0 | 1 | 1 | 1 | $K''_{0111} = F(K'_{0111}, K'_{0011})$ |
| | | | | | $= F(K_{0111}, K_{0011})$ |
| Key 8 | 1 | 0 | 0 | 0 | $K''_{1000} = K'_{1000} = New\_Key_1$ (Unchanged) |
| Key 9 | 1 | 0 | 0 | 1 | $K''_{1000} = K'_{1001} = F(K_{1001}, K_{0001})$ (Unchanged) |
| Key 10 | 1 | 0 | 1 | 0 | $K''_{1010} = K'_{1010} = F(K_{1010}, K_{0010})$ (Unchanged) |
| Key 11 | 1 | 0 | 1 | 1 | $K''_{1011} = K'_{1011} = F(K_{1011}, K_{0011})$ (Unchanged) |
| Key 12* | 1 | 1 | 0 | 0 | $K''_{1100} = F(K'_{1100}, K'_{1000})$ |
| | | | | | $= F(F(K_{1100}, K_{0100}), New\_Key_1)$ |
| Key 13* | 1 | 1 | 0 | 1 | $K''_{1101} = F(K'_{1101}, K'_{1001})$ |
| | | | | | $= F(F(K_{1101}, K_{0101}), F(K_{1001}, K_{0001}))$ |
| Key 14* | 1 | 1 | 1 | 0 | $K''_{1110} = F(K'_{1110}, K'_{1010})$ |
| | | | | | $= F(F(K_{1110}, K_{0110}), F(K_{1010}, K_{0010}))$ |
| Key 15* | 1 | 1 | 1 | 1 | $K''_{1111} = F(K'_{1111}, K'_{1011})$ |
| | | | | | $= F(F(K_{1111}, K_{0111}), F(K_{1011}, K_{0011}))$ |

In particular, Table 5 shows the value of each key after the second update, made in response to the second eviction, i.e., the eviction of user $U_2$. The asterisk identifies the keys compromised by the second eviction. As illustrated, key 4 is generated while keys 5–7 and 12–15 are updated.

In a similar manner to the first eviction of user $U_3$, compromised keys 5–7 and 12–15 are updated separately by the key server and by each non-evicted user that knows the particular compromised key.

The right hand column in Table 5 shows the value of the updated keys K" first in terms of the previously updated keys K' after the first eviction, and then in terms of the original keys. For example, consider the example of key 12, where $K''_{1100} = F(K'_{1100}, K'_{1000})$. In other words, key 12 (after the second eviction) is based on key 12 after the first eviction as well as key 8 after the first eviction. Similarly, key 12 after the first eviction is based on original key 12 as well as the original key 4 (i.e., $K'_{1100} = F(K_{1100}, K_{0100})$, see Table 4). Key 8 after the first eviction is the generated key $New\_Key_1$, (see Table 4). The value of $K''_{1100}$ can then be represented in terms of the original keys by substituting in the appropriate values for the K' keys, yielding $K''_{1100} = F(K'_{1100}, K'_{1000}) = F(F(K_{1100}, K_{0100}), New\_Key_1)$.

Suppose now, that the evicted users $U_3$ and $U_2$ decide to get together and share all of the keys they know. Despite their collusion, users $U_3$ and $U_2$ cannot infer any currently active key. The following illustration in Table 6 describes, for each currently active key, why that key cannot be derived or inferred by the evicted users, even if they collude.

TABLE 6

| Key | Reason |
|---|---|
| Key 1 ($K''_{0001}$) | Equals $K_{0001}$, which is never known to the colluders |
| Key 2 ($K''_{0010}$) | Equals $K_{0010}$, which is never known to the colluders |
| Key 3 ($K''_{0011}$) | Equals $K_{0011}$, which is never known to the colluders |
| Key 4 ($K''_{0100}$) | Equals $New\text{-}Key_2$, which is never known to the colluders |
| Key 5 ($K''_{0101}$) | Derived from $K_{0001}$, which is never known to the colluders |
| Key 6 ($K''_{0110}$) | Derived from $K_{0010}$, which is never known to the colluders |
| Key 7 ($K''_{0111}$) | Derived from $K_{0011}$, which is never known to the colluders |
| Key 8 ($K''_{1000}$) | Equals $New\text{-}Key_1$, which is never known to the colluders |
| Key 9 ($K''_{1001}$) | Derived from $K_{0001}$, which is never known to the colluders |
| Key 10 ($K''_{1010}$) | Derived from $K_{0010}$, which is never known to the colluders |
| Key 11 ($K''_{1011}$) | Derived from $K_{0011}$, which is never known to the colluders |
| Key 12 ($K''_{1100}$) | Derived from $K'_{1000}$, which is $New\text{-}Key_1$, which is never known to the colluders |
| Key 13 ($K''_{1101}$) | Derived from $K'_{1001}$, which is derived from $K_{0001}$, which is never known to the colluders |
| Key 14 ($K''_{1110}$) | Derived from $K'_{1010}$, which is derived from $K_{0010}$, which is never known to the colluders |
| Key 15 ($K''_{1111}$) | Derived from $K'_{1011}$, which is derived from $K_{0011}$, which is never known to the colluders |

Table 6 is noteworthy because it illustrates the evolution of the key set over time. After an eviction, the key set remains constant until another eviction occurs. It should be noted that, in one embodiment, the key set is modified periodically to protect against time-consuming attempts to derive the keys.

In another embodiment, artificial evictions are performed just prior to an addition of a user. This artificial eviction prevents the new user from decoding any communications sent during the period from the previous eviction and the current addition. In other words, the artificial eviction ensures that the new user will get a set of keys that are valid only from the time of the user's addition.

As thus described, the RPS group provides a mechanism that enables the key server and the group users to update the keys independently. Encrypted key distribution messages can therefore be eliminated in the portion of the hierarchical tree that the RPS group replaces. As described above, self-repairing groups can be applied to any type of key distribution method (e.g., LKH, OFT, and OFC).

To illustrate the particular application of RPS groups to a hierarchical tree, consider the example hierarchical tree illustrated in FIG. 4. In the illustrated example, an RPS group is defined for users $U_0$–$U_7$, with user $U_0$ being evicted.

An update request message $E_D$ is then broadcast to non-evicted users $U_1$–$U_7$. The update request message instructs each of the non-evicted users $U_1$–$U_7$ to update all of the compromised keys. In this case, the compromised keys are illustrated as those keys identified by the '0' column of FIG. 7. Independent updating of the keys $K_x$ would then yield new keys $K'_x$ as described above.

As would be appreciated, even if the evicted user $U_0$ obtained update request message $E_D$, security would not be compromised because the evicted user $U_0$ would not be able to synchronously update new versions of the keys that he possessed. For this reason, in one embodiment, the update request message can be sent in an unencrypted form.

As described above, one of the compromised keys to be updated is the key $K_{11111}$. Key $K_{11111}$ is the key that is known by all of the users $U_0$–$U_7$ in the RPS group. As such, in one embodiment, key $K_{11111}$ can be used as the common leaf-type node key D (see FIG. 3B).

Upon eviction of user $U_0$, key $K_{11111}$ is independently updated by both the key server and non-evicted users $U_0$–$U_7$ through the calculation of $K'_{11111}=F(K_{11111}, K_{11110})$. The updated key $K'_{11111}$ then represents the new common leaf-type node key D. This new key can then be used to acquire the new keys for interior nodes B and A in accordance with the particular key distribution method (e.g., LKH, OFT, and OFC). As noted above, when a new user is added into the vacant slot formerly occupied by user $U_0$, an additional eviction of user $U_0$ occurs just prior to the addition of the new user. This ensures that the new user does not have access to prior communications that occurred after the first eviction of user $U_0$.

In an alternative embodiment, the RPS group is based on a power set that does not include the element $\{U_0, U_1, U_2, \ldots, U_N\}$. Thus, the power set would have a set of $2^N-2$ elements. The initial secret (or key) that is shared by the RPS group members is then provided by the key server. When a user is evicted, then the new RPS group key is a blinded key. Specifically, the key known by all of the non-evicted users is blinded using a one-way function.

For example, if user $U_1$ is evicted, then the key known by all of the non-evicted users is the key $K_{11101}$. This key is then blinded using a one-way function G. The blinded key is then used as the start of the key distribution process in replacing the compromised keys in the interior nodes.

If users $U_2$ and $U_3$ are subsequently evicted, then the key known by all of the non-evicted users is the key $K'_{10011}$. This key is then blinded using a one-way function to yield $G(K'_{10011})=G(F(K_{10011}, K_{10001}))$. The new blinded key is then used as the start of the key distribution process in once again replacing the compromised keys in the interior nodes.

As described, the RPS group enables the RPS group members and the key server to determine a new RPS group secret independently. This process obviates the need for key distribution messages that would have been used to update the portion of the hierarchical tree that the RPS group structure replaces. Bandwidth is thereby conserved.

Figure 13:
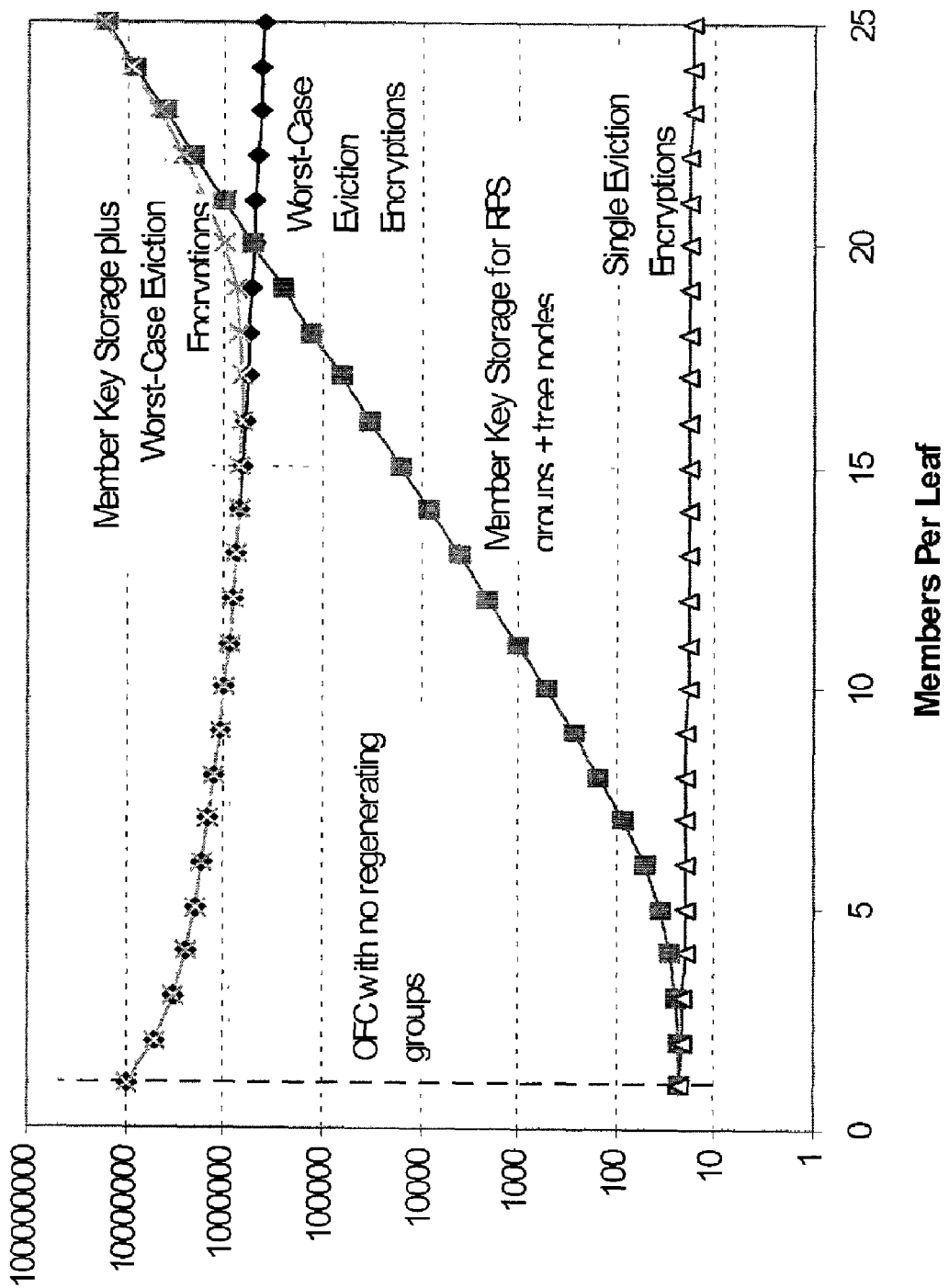
FIG. 13 illustrates an effect of self-repairing groups.

An illustration of the impact of self-repairing groups on key distribution is provided in FIG. 13. FIG. 13 shows how four variables vary in an OFC tree with RPS groups at the leaf nodes as the average number of members per RPS group varies. If there is one member per RPS group, then that is equivalent to not having self-repairing groups at all. As illustrated, the number of encryptions that are sent out in a multiple eviction dramatically decreases through the use of self-repairing groups at the leaf nodes of a tree. This is due to the fact that self-repairing groups, as graphically illustrated in FIG. 5, remove the lowest levels of a tree. In a multiple eviction in which many members are evicted, most of the encryptions correspond to nodes toward the bottom of the tree because the number of nodes at each level of a binary tree doubles at each succeeding level.

While the invention has been described in detail and with reference to specific embodiments thereof, it will be apparent to one skilled in the art that various changes and modifications can be made therein without departing from the spirit and scope thereof. In particular, it should be noted that while the above description was stated in the context of encryption keys, the principles of the present invention can be applied to any application environment that uses shared secrets. Thus, it is intended that the present invention cover the modifications and variations of this invention provided they come within the scope of the appended claims and their equivalents.

What is claimed is:

1. A method for reducing bandwidth needed to transmit key update information for a plurality of members forming a group, comprising:
   (a) associating a subgroup of said group with a leaf node of a hierarchical tree, said leaf node having associated therewith a leaf key common to members of said subgroup, wherein upon eviction of at least one member of said group, said leaf key enables said members of said subgroup to receive an update message for an interior node above said leaf node;
   wherein said subgroup is a self-repairing group, said self-repairing group being operative to update said leaf key independently;
   wherein each of said members of said subgroup is capable of independently updating a shared interior node key;
   wherein said self-repairing uses a reusable power set;
   wherein said reusable power set uses a power set of said members in said subgroup as a basis for group key updates;
   wherein said reusable power set includes $2^N$ sets, where N includes the number of said members.

2. The method of claim 1, wherein said evicted member is not a part of said subgroup.

3. The method of claim 1, wherein said evicted member is part of said subgroup.

4. The method of claim 1, wherein said group key updates are performed using a logical key hierarchy method.

5. The method of claim 1, wherein said group key updates are performed using a one-way function tree method.

6. The method of claim 1, wherein said group key updates are performed using a one-way function chain method.

7. The method of claim 1, wherein said hierarchical tree is a binary tree.

8. The method of claim 1, wherein said updating of said shared interior node key is carried out in a single step.

9. The method of claim 1, wherein said updating of said shared interior node key is not dependent on key distribution messages from a root node that update further node keys descending from said shared interior node key.

10. A key distribution method, comprising:
   (a) evicting at least one member of a group, said group having a plurality of members that share a common node key;
   (b) notifying a plurality of members of said group that said at least one member has been evicted; and
   (c) determining a new value for said common node key, wherein said determination is capable of being performed independently by said plurality of members of said group;

wherein said plurality of members of said group and said at least one evicted member form a self-repairing group;

wherein each of said members of said group is capable of independently updating the common node key;

wherein said self-repairing group uses a reusable power set;

wherein said reusable power set uses a power set of said members in said self-repairing group as a basis for group key updates;

wherein said reusable power set includes $2^N$ sets, where N includes the number of said members.

11. The method of claim 10, wherein said evicting comprises evicting one member of said group.

12. The method of claim 10, wherein said evicting comprises evicting more than one member of said group.

13. The method of claim 10, wherein said notifying comprises transmitting identities of said at least one evicted member.

14. A key distribution method, comprising:

(a) grouping a plurality of said members of said group to form a subgroup of said group, said subgroup having a common key known only to said members of said subgroup, said common key being associated with a common node in a hierarchical tree, said subgroup members being operative to independently update said common key upon eviction of one or more members of said subgroup; and (b) distributing key update messages for said hierarchical tree upon eviction of one or more members of said subgroup, wherein said distributed key update messages do not update keys associated with nodes below said common node;

wherein said subgroup is self-repairing, and each of said members of said subgroup is capable of independently updating the common key;

wherein said self-repairing subgroup uses a reusable power set;

wherein said reusable power set uses a power set of said members in said subgroup as a basis for said key update messages;

wherein said reusable power set includes $2^N-1$ sets where N includes the number of said members.

15. The method of claim 14, wherein said key update messages are based on a logical key hierarchy method.

16. The method of claim 14, wherein said key update messages are based on a one-way function tree method.

17. The method of claim 14, wherein said key update messages are based on a one-way function chain method.

18. The method of claim 14, wherein said hierarchical tree is a binary tree.

19. A secret sharing system, comprising:

a key server that is operative to associate a subgroup of a group having a plurality of members with a leaf node of a hierarchical tree, said leaf node having associated therewith a leaf key common to members of said subgroup, wherein upon eviction of at least one member of said group, said key server uses said leaf key to transmit an update message to said members of said subgroup for a key associated with an interior node above said leaf node;

wherein said subgroup is self-repairing, and each of said members of said subgroup is capable of independently updating a shared interior node key;

wherein said self-repairing subgroup uses a reusable power set;

wherein said reusable power set uses a power set of said members in said subgroup as a basis for said update message;

wherein said reusable power set includes $2^N-1$ sets where N includes the number of said members.

20. A computer program product, comprising:

computer-readable program code for causing a computer to associate a subgroup of a group having a plurality of members with a leaf node of a hierarchical tree, said leaf node having associated therewith a leaf key common to members of said subgroup, wherein upon eviction of at least one member of said group, said leaf key enables said members of said subgroup to receive an update message for a key associated with an interior node above said leaf node; and a computer-usable medium configured to store the computer-readable program codes;

wherein said subgroup is self-repairing, and each of said members of said subgroup is capable of independently updating a shared interior node key;

wherein said self-repairing subgroup uses a reusable power set;

wherein said reusable power set uses a power set of said members in said subgroup as a basis for said update message;

wherein said reusable power set includes $2^N-1$ sets, where N includes the number of said members.

* * * * *

UNITED STATES PATENT AND TRADEMARK OFFICE
CERTIFICATE OF CORRECTION

PATENT NO. : 7,043,024 B1  
APPLICATION NO. : 09/836238  
DATED : May 9, 2006  
INVENTOR(S) : Dinsmore et al.

Page 1 of 1

It is certified that error appears in the above-identified patent and that said Letters Patent is hereby corrected as shown below:

In the claims:  
col. 16, line 33 insert --group-- before "uses" and after "self-repairing";  
col. 17, line 42 insert --,-- before "where" and after "sets";  
col. 18, line 21 insert --,-- before "where" and after "sets".

Signed and Sealed this

Twentieth Day of May, 2008

JON W. DUDAS  
*Director of the United States Patent and Trademark Office*